(12) United States Patent
Goodwin

(10) Patent No.: US 7,866,180 B2
(45) Date of Patent: Jan. 11, 2011

(54) GRADED PRESSURE APPARATUS FOR COOLING FOOD AND BEVERAGES AND METHODS OF MAKING THE SAME

(75) Inventor: Diana Goodwin, 5714 NW. 48th Ct., Coral Springs, FL (US) 33067

(73) Assignee: Diana Goodwin, Lake Worth, FL (US)

( * ) Notice: Subject to any disclaimer, the term of this patent is extended or adjusted under 35 U.S.C. 154(b) by 1164 days.

(21) Appl. No.: 11/337,340

(22) Filed: Jan. 23, 2006

(65) Prior Publication Data
US 2007/0169883 A1 Jul. 26, 2007

(51) Int. Cl.
*F25D 3/08* (2006.01)
(52) U.S. Cl. ............. 62/294; 62/371; 62/457.3
(58) Field of Classification Search ............ 62/294, 62/371, 372, 457.3, 457.4
See application file for complete search history.

(56) References Cited

U.S. PATENT DOCUMENTS

| 3,494,142 | A | * | 2/1970 | Beck | 62/294 |
|---|---|---|---|---|---|
| 3,726,106 | A | * | 4/1973 | Jaeger | 62/294 |
| 3,852,975 | A | * | 12/1974 | Beck | 62/294 |
| 4,679,407 | A | * | 7/1987 | Kim et al. | 62/294 |
| 5,609,038 | A | * | 3/1997 | Halimi | 62/294 |
| 5,655,384 | A | * | 8/1997 | Joslin, Jr. | 62/294 |
| 5,704,222 | A | | 1/1998 | Hage et al. | |
| 5,750,222 | A | * | 5/1998 | Komatsu et al. | 428/35.8 |
| 5,946,930 | A | | 9/1999 | Anthony | |
| 6,065,300 | A | | 5/2000 | Anthony | |
| 6,125,649 | A | * | 10/2000 | Sillince | 62/480 |
| 6,151,911 | A | * | 11/2000 | Dando et al. | 62/457.3 |
| 6,170,283 | B1 | | 1/2001 | Anthony | |
| 6,817,222 | B2 | | 11/2004 | Day et al. | |
| 6,917,202 | B2 | * | 7/2005 | Brune et al. | 324/326 |
| 7,082,784 | B2 | * | 8/2006 | Roth et al. | 62/457.2 |
| 2005/0028550 | A1 | * | 2/2005 | Crettet | 62/391 |
| 2005/0066682 | A1 | | 3/2005 | Anthony | |

* cited by examiner

*Primary Examiner*—William E Tapolcai
(74) *Attorney, Agent, or Firm*—Ronald V. Davidge

(57) ABSTRACT

A self cooling container for a beverage includes a receptacle holding a refrigerant under pressure. When an outer cap of the container is opened, the refrigerant is exhausted, cooling the receptacle and the beverage surrounding it. The receptacle includes an inner receptacle member and one or more walls extending around the receptacle member, with spaces between adjacent walls being established at descending pressure values outward from the inner receptacle, which is held at a high pressure.

7 Claims, 29 Drawing Sheets

GRADED PRESSURE APPARATUS FOR COOLING FOOD AND BEVERAGES AND METHODS OF MAKING THE SAME

BACKGROUND OF THE INVENTION

1. Field of the Invention

The present invention is about a new technology for self-cooling food and beverage containers and about methods of manufacturing these containers. The novel invention is a simple and cost effective apparatus and the invention reveals a new way of manufacturing and using this apparatus to store high pressure refrigerants such as $CO_2$, $CF_4$, nitrogen and $Co_2$ mixtures and other suitable gases. The technology can be described as a graded pressure index technology. The terms used in this description of the invention can take on several meaning all of which are related to the subject matter. For example the terms "food" and "beverage" are interchangeable. One skilled in the art will appreciate that the use of general terms does not hamper the inventiveness.

2. Description of the Prior Art

Many self-cooling beverage systems have been described in prior art. In particular, systems that use rigid containers or flexible receptacles have been described. However, all these systems lack the inventiveness of the present invention. All prior art relies on a continuous and even pressure distribution in either a single-walled container, or a series of containers, and they all fail to apply a graded pressure support technology to hold high pressure refrigerants. The real problem in using a low cost flexible member in such applications, stems from the fact that a simple receptacle built from flexible plastic materials cannot hold the pressure of such refrigerants because the hoop and lateral stresses break the walls easily, and one cannot easily rely on making the walls thicker, since the walls themselves are subject to limiting stresses no matter how thick one makes them. Further, one loses the commercial viability by using thick-walled containers that can be very cost prohibitive.

U.S. Pat. Nos. 5,704,222 and 5,946,930 to Anthony shows a flexible receptacle that relies on pressure equilibration across the walls of the receptacle. Thus, in these inventions Anthony describes how a low cost flexible plastic receptacle can be used to store a high pressure fluid by transmitting the pressure of a beverage through the receptacle walls and equilibration of the pressure inside the refrigerant receptacle with the pressure outside the receptacle.

In all these prior inventions, the receptacle walls are in perfect equilibrium, holding no pressure forces, since the pressure forces acting on each side of the receptacle is the same. Suffice it to say that the inventiveness of these flexible receptacles is based on inventions by Anthony are indeed innovative, but they are limited as follows:

a) the Anthony receptacles have equal pressures on the inside and outside walls of the receptacle, and so do not experience any forces.

b) the Anthony receptacles rely on the beverage container to ultimately hold the refrigerant pressure.

It is one of the objectives of the present invention to disclose a new method of graded pressure indexing to gradually transmit pressure forces through a series of concentric flexible receptacles from a high pressure region in the inner most receptacle to a low pressure region in the outermost receptacle, so that the gradual graded index pressure gradient is insufficient to destroy each of the receptacles. It is then important that for the practice of the present invent, none of the receptacles maintain a pressure differential across its walls that can destroy it. Suffice it to say that the seemingly impossible can be achieved by a gradual pressure gradient, such that each pressure differential is below the pressure holding capacity of each nested receptacle member. So, with great pride, I declare that such a combination of receptacles can ultimately hold a very high pressure within them; the differential across each wall is small enough to be held completely by the receptacle wall in question. It is therefore a precious advantage of the present invention that each pressure receptacle is capable of holding across its walls some pressure differential without being destroyed.

It is a further great advantage of this invention that this high pressure flexible receptacle that can be easily inserted to a beverage bottle or beverage metal can because it is flexible. Thus, pressure equilibration is undesirable for this invention, since if all the nested receptacles were to equilibrate the pressure differentials across their walls, the ultimate high pressure within the inner most receptacle will indeed be transmitted to the outer most receptacle and the receptacles will successive be destroyed by this high pressure. The Anthony inventions are therefore inadequate to perform the functions of holding pressures beyond the capacity of the beverage container itself.

SUMMARY OF THE INVENTION

The present invention achieves its meritus status by using a graded pressure differential and several concentric nested receptacles in the manner of Russian dolls. It accomplishes its objectives as stated in this disclosure, so that one skilled in the art may determine by a fair reading and interpretation of the entire specification that the invention is novel and practical. For the several embodiments, the graded pressure receptacle cooling apparatus consists of a standard beverage or container in the form of a plastic bottle or an aluminum can that contains a beverage.

The first of several embodiments consists of a multilayered plastic receptacle assembly, wherein each receptacle layer is nested within another up to a number of predetermined receptacles, so that the pressure difference between each receptacle wall is less that the holding pressure of each of the said receptacle walls. Advantageously, the flexible multilayer plastic receptacle can then be easily inserted to any beverage container without difficulty.

In the first embodiment, the receptacle assembly is made from multiple layers of separated plastic film of pre-determined tensile strength and thicknesses. This multiple layered plastic film could be in the form of a roll, so that it can be unrolled and introduced into thermal sealing equipment. A thermal sealing die is used to thermally fuse all the layers around a thermal seal edge to form the multilayered receptacle assembly. It is important that the thermal die that welds the edges of the receptacle films be shaped to only seal the receptacle side walls and bottom walls and leave an open mouth on all the layers. A multilayer plastic receptacle is thus created in this manner with an open end. The multilayer plastic receptacle is then cut out and separated from the film role for further processing. One could also use sheets and other forms of processing to achieve this. One now has a multilayer plastic receptacle with nested walls, co-joined at only the boundary welded edges. Of course one could make each receptacle separately and then insert them into one another and achieve the same this, so the method I describe here is not a limiting method, but merely an example to show how this can be achieved easily. The space between the receptacle walls can be filled with a hydraulic fluid such as water or just left as an air gap. But be warned that if an air gap is what is desired, the calculations for making the pressure index gradient are tedious and involve partial differential equations that cannot be easily solved. The filling of the hydraulic fluid could be achieved through the separated layers of the multiple receptacle open neck, so that each receptacle wall is fluidly connected to the over it by an incompressible fluid. In certain cases, a pressurized gas may be used to achieve the separation between the receptacle layers. If a flexible receptacle wall that has high elasticity is used, the receptacles can be made independently instead using a multilayered role, such that each receptacle can be sized to expand to a fixed volume that will compress the fluid separating it from the other and generate a pressure gradient of fixed predetermined value. For example, oriented polyethylene-teraphthalate film or Poly-vinyl Chloride (PVC) film (stretch-warp film) can be used, such that the receptacles can expand to a predetermined maximum volume and then stop expanding.

After manufacture of the multilayered plastic receptacle, a sealing cap is introduced into the open mouth and thermally fused with the receptacle assembly to form a sealed receptacle subassembly.

Sealing cap member is designed with a sealing cap cylindrical sleeve around which is a sealing cap flange as shown in the figures. A sealing cap opening forms a passageway for refrigerant and beverage to enter the completed apparatus. Sealing cap flexible members protrude from the sealing cap cylindrical sleeve to connect to a sealing cap receptacle sealing cylinder. Thus, there are large beverage passages formed between the sealing cap receptacle sealing cylinder and the sealing cap cylindrical sleeve. Sealing cap cylindrical sleeve is designed to snugly fit into the threaded open neck of a beverage bottle, so that a sealing cap flange rests on the top open edge of the threaded open neck of the beverage bottle. The sealing cap cylindrical sleeve can also be designed to fit on the open rim of a metal can, so that the large openings will allow beverage to pass freely into the beverage bottle. In the case of a metal can, the diameter of the sealing cap cylindrical sleeve must be large enough to form a snug fit with the rim of the metal container, and the height of the sealing cap flexible members must be adjusted according to the clearances needed for the beverage filling process.

The multiple layer receptacle opening is then sealingly fused by applying heat to the sealing cap receptacle sealing cylinder, so that a hermetic seal is formed between the receptacle layers and the sealing cap sealing cylinder. Sealing cap member also has a needle molded directly within its body to fluidly transmit fluid through the sealing cap into the multilayer receptacle assembly. A sealing cap through hole allows refrigerant to be introduced through the needle into the receptacle assembly during charging.

Sealing cap receptacle sealing cylinder has a cylinder inner surface that is smooth to form a sealing surface for a rubber plug member. A sealing cap receptacle opening support member protrudes from the sealing cap cylinder bottom surface, and forms a support member for the multilayer receptacle assembly during thermal sealing.

After the multilayer plastic receptacle has been formed and thermally or chemically bonded to the sealing cap member, the assembly can then be inserted into the open threaded neck of the beverage bottle, so that the sealing cap flange rests on the top surface of the open threaded neck of the beverage bottle. The multilayer plastic receptacle assembly is thus hanging inside the beverage bottle or metal can after assembly.

In the first of several embodiments, the receptacle can now be charged with a refrigerant so that the refrigerant R will fill the innermost chamber and create a pressure force on its walls. The walls of the innermost receptacle will expand up to the pressure holding limit of the receptacle so that any excess force is transmitted by its slight expansion to the hydraulic fluid or air trapped between the innermost receptacle and the outermost receptacle. The pressure transmitted to the second receptacle member is less than the pressure held inside the innermost receptacle, so that it too will transmit its excess pressure to the third receptacle and so on. This way, a pressure gradient is formed by beams of the grading of the mechanical stresses due to the tensile strength of the plastic film and the thickness of each film that forms each layer of the multiple layer receptacle assembly.

The general pressure gradient sequence is as follows:

$P_{ref}$ acts on the inner most receptacle walls;
$P_2 = P_{ref}$ – Pressure holding force of inner most wall;
$P_3 = P_2$ – Pressure holding force of second most wall;
$P_n = P_{n-1}$ – Pressure holding force of $n^{th}$ most wall;

Here, $P_{ref}$ is the refrigerant R pressure and $P_{i=1, 2, 3 \ldots n}$ is the pressure acting on the $n^{th}$ receptacle wall.

It is important that the $n^{th}$ receptacle wall be able to hold the differential pressure across its wall and the next, so that the tensile strength and the cross section of its wall must be capable of holding the pressure $P_n$. Thus, each receptacle wall is essentially capable of holding the pressure differential it experiences, and advantageously the apparatus is stable and undamaged.

After charging with refrigerant, a semi-permeable rubber plug is snugly fitted into the sealing cap sealing cylinder, so that the rubber plug cylinder mates sealingly with the sealing cap receptacle sealing cylinder inner surface. At the same time, the rubber plug will plug off the refrigerant charge needle hole preventing refrigerant from escaping from the apparatus. Beverage can now be filled into the beverage bottle through the threaded open neck of the beverage bottle and through the sealing cap cylindrical sleeve by passing it through the beverage passages and into the beverage bottle. The beverage bottle is sealed with a beverage cap and carbonation pressure build therein so that the rubber plug member experience said pressure. Since the rubber plug forms an air chamber with the sealing cap member and it is slightly permeable to gases, the carbonation gases will enter into the air chamber and fill it with pressurized carbon dioxide or nitrogen. When the beverage container is opened by removing the beverage bottle cap, the carbonation pressure loss outside the rubber plug causes the rubber plug to be pushed away from the needle and the refrigerant escapes through the needle into the atmosphere. The beverage is then cooled by the evaporation of the refrigerant from the multiple layer plastic receptacle.

In a second embodiment of several others, a multiple receptacle apparatus is disclosed, with an inner receptacle member of cylindrical form having an inner receptacle cylindrical body unified with an inner receptacle cylinder base dome. The inner receptacle cylindrical body terminates at an inner receptacle opening where an inner receptacle flange is formed. The inner receptacle cylindrical base dome has a small bulge that is used to act as a spacer for the second receptacle member. An inner receptacle alignment ridge on the walls of the inner receptacle cylindrical body is used to space the second receptacle from the said inner receptacle inside walls.

A receptacle plug member consists of a receptacle plug cylindrical body terminating on a receptacle plug top wall. A receptacle plug cylinder protrudes from the receptacle plug top wall, to form an air chamber. The air chamber forms a seat from the rubber plug mentioned earlier. A receptacle plug sealing edge is formed on the lower open edge of the receptacle plug outer cylindrical body. A receptacle plug cylinder protrudes centrally from the inside of the receptacle plug top wall. During assembly, the receptacle plug member is sealingly inserted into the inner receptacle opening. The air chamber now faces outward ready to receive the rubber plug. A needle is molded into the body of the receptacle plug member to form a fluid communication means between the inside of the inner receptacle member and the outside of the receptacle plug air chamber.

To assemble the unit, a second receptacle member is introduced. The second receptacle is essentially an open ended receptacle similar to a cigar tube with a closed end but made from heat shrinkable materials. It comprises a second receptacle cylindrical wall sealingly connected to a second receptacle base dome. A second receptacle alignment ridge connects the second receptacle base dome to the second receptacle cylindrical body. The second receptacle cylindrical body terminates in a second receptacle open neck. The inner receptacle subassembly is inserted into the second receptacle open neck so that the inner receptacle dome spacing bulge rests on the inside of the second receptacle base dome. The inner receptacle alignment ridge keeps the two receptacles separated by a concentric space, so that a fluid such as water can be filled into this space. Heat is then applied to the open neck of the second receptacle cylindrical wall. The heat causes this wall to shrink and sealingly clamp over the compress over the receptacle plug sealing edges to seal off the inner hydraulic support cavity. Thus, fluid is trapped between the inner receptacle member and the outer receptacle member. A third receptacle member can be placed following a similar process as outlined above to form a second hydraulic support chamber, and then a third or fourth hydraulic chamber. The third receptacle member also has a third receptacle cylindrical wall terminating in a third receptacle open neck. A third receptacle alignment ridge is also provided and functions for the same purposes as mentioned for the first and second receptacle members. Similarly, the subassembly is inserted to the inside cavity of the third receptacle member and then heat sealed with the second and third receptacle assembly to form a second hydraulic pressure support chamber.

The unit is then charged with refrigerant through the needle hole and the rubber plug placed snugly into the receptacle plug air chamber inside walls to plug off the needle opening. The assembly can then be inserted into a beverage bottle or can to freely float or be held by the neck opening as per the earlier embodiments.

In yet a third embodiment of the present invention, the receptacle members could be formed in the shape of a small tube with multiple concentric layers spaced apart by a hydraulic fluid or air. One tube end is sealed over the multilayer cap member formed to a suitable size and the other end is heat sealed to fuse all the layers together.

In yet a fourth embodiment of the present invention, the multiple layered receptacle member of the first embodiment can be thermally fused at various fused pressure support joints so that it can handle more pressure. This is simply achieved by a modification of the thermal sealing die.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE INVENTION

Figure 1:
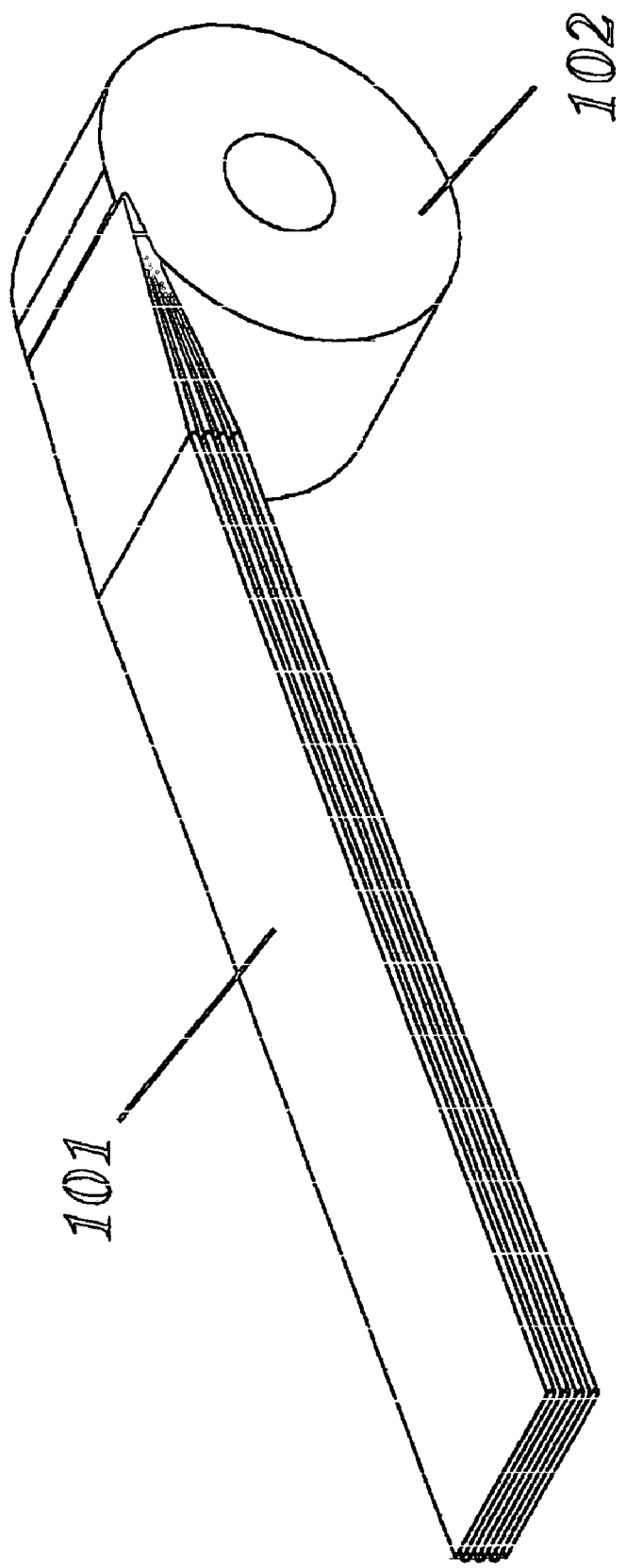
FIG. 1 shows a multilayered film roll being unrolled.
Figure 2:
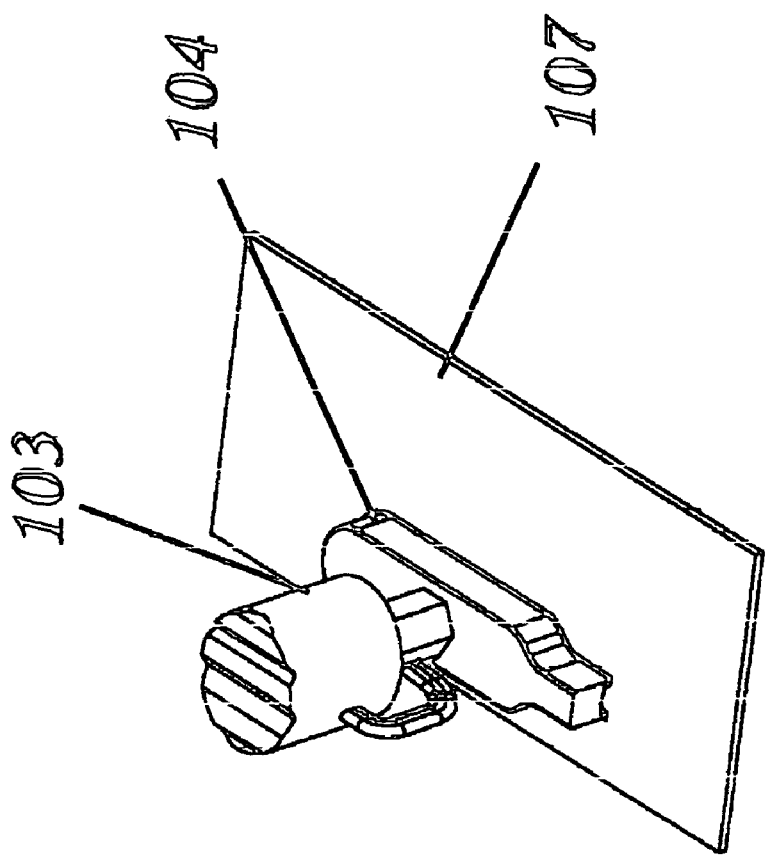
FIG. 2 shows a heat sealing equipment with a base support, a thermal sealing die, and a hydraulic actuator ram.
Figure 3:
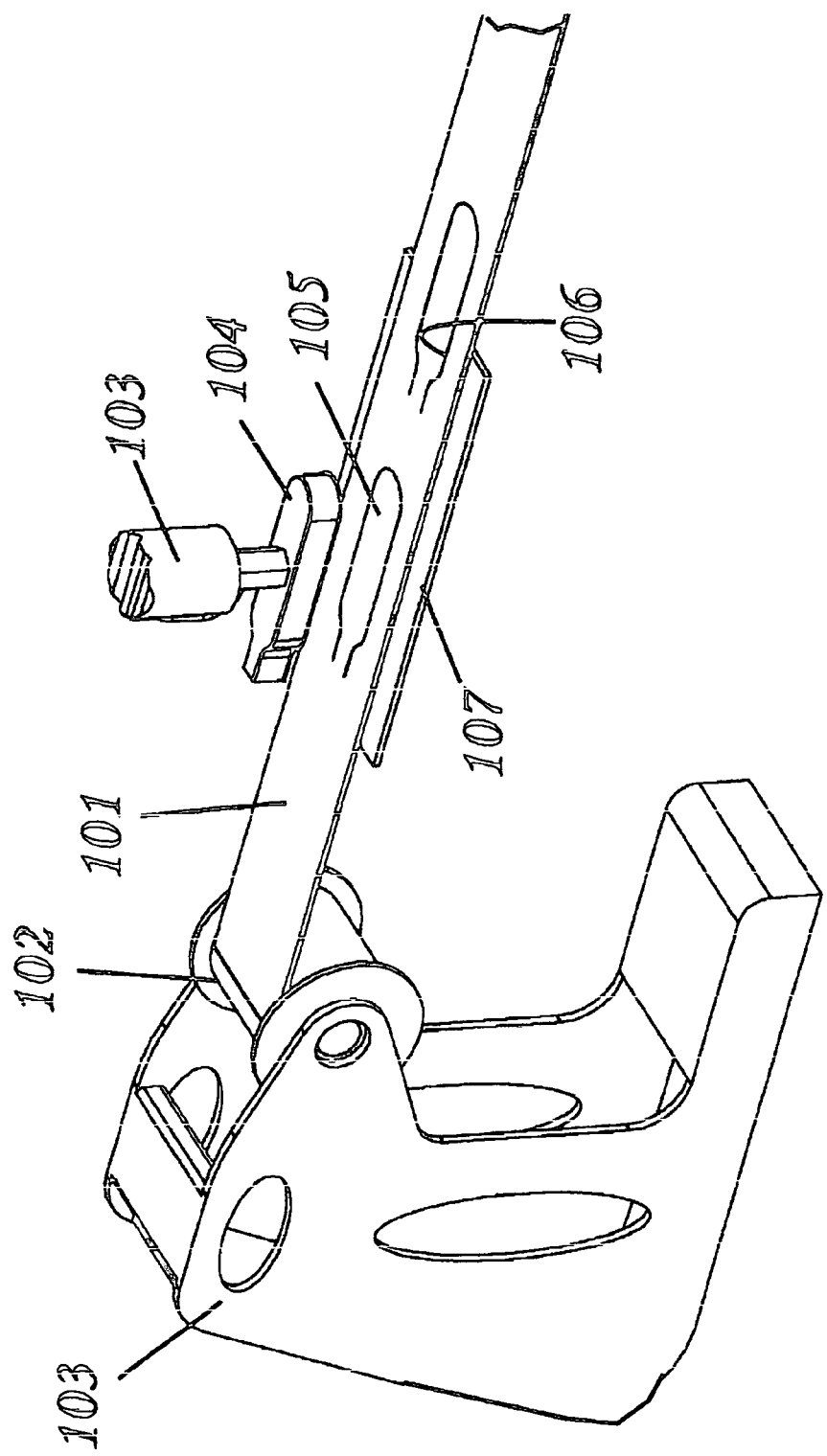
FIG. 3 shows the film roll being heat sealed to form receptacle members with multiple layers.
Figure 4:
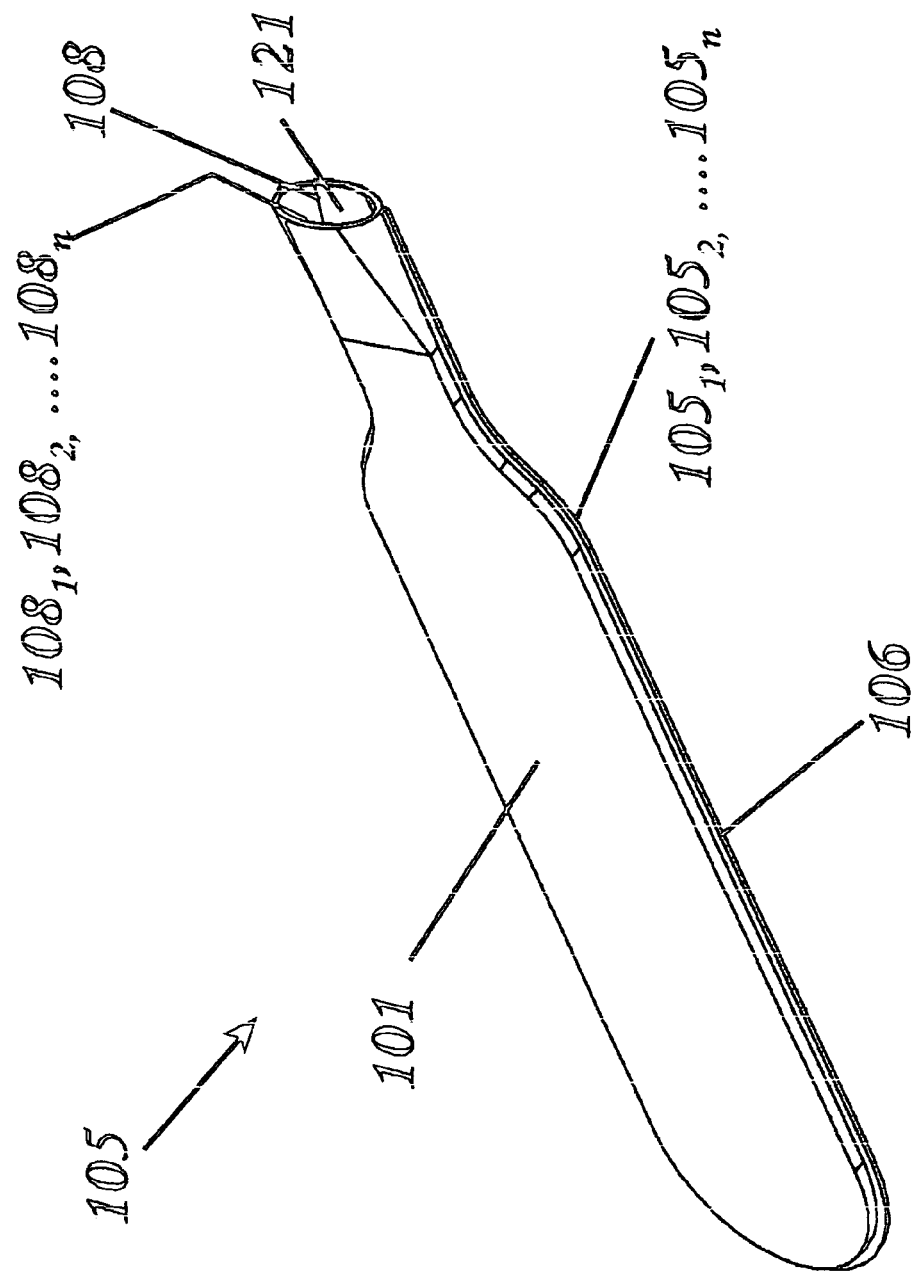
FIG. 4 shows a formed multilayer receptacle with the individual receptacle members all sealed to form a unified multilayer receptacle.
Figure 5:
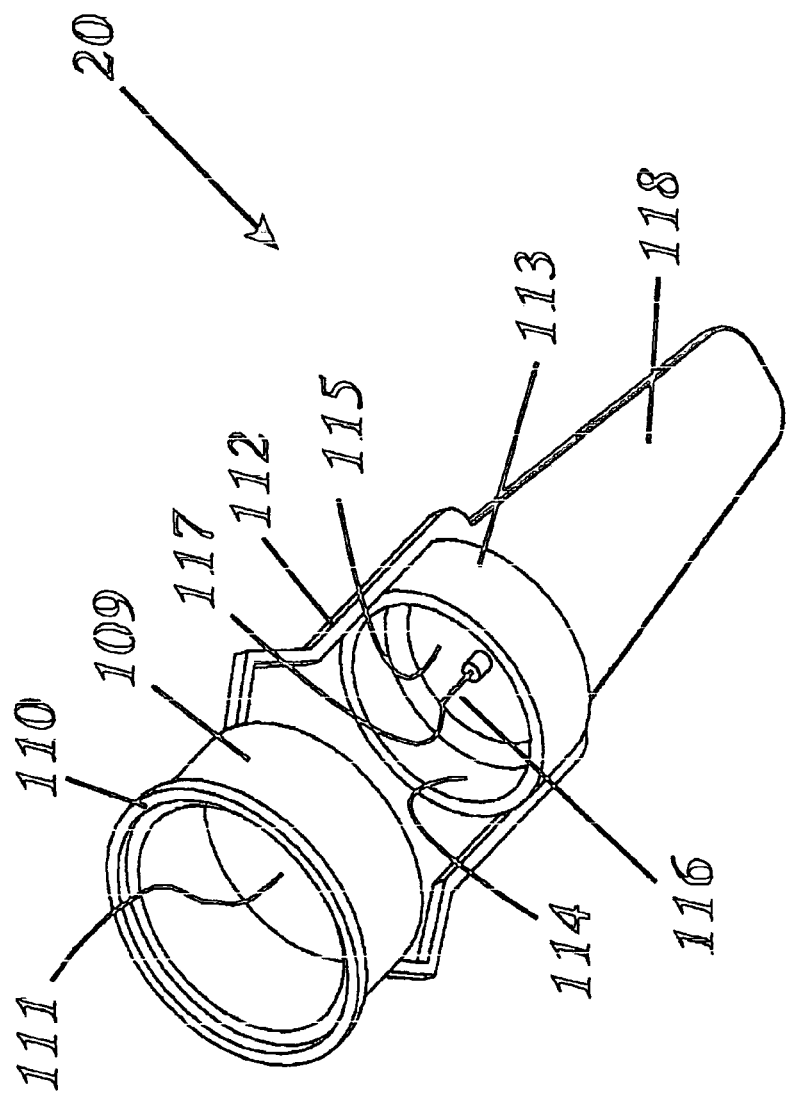
FIG. 5 shows the sealing cap for the multi-layer receptacle.
Figure 6:
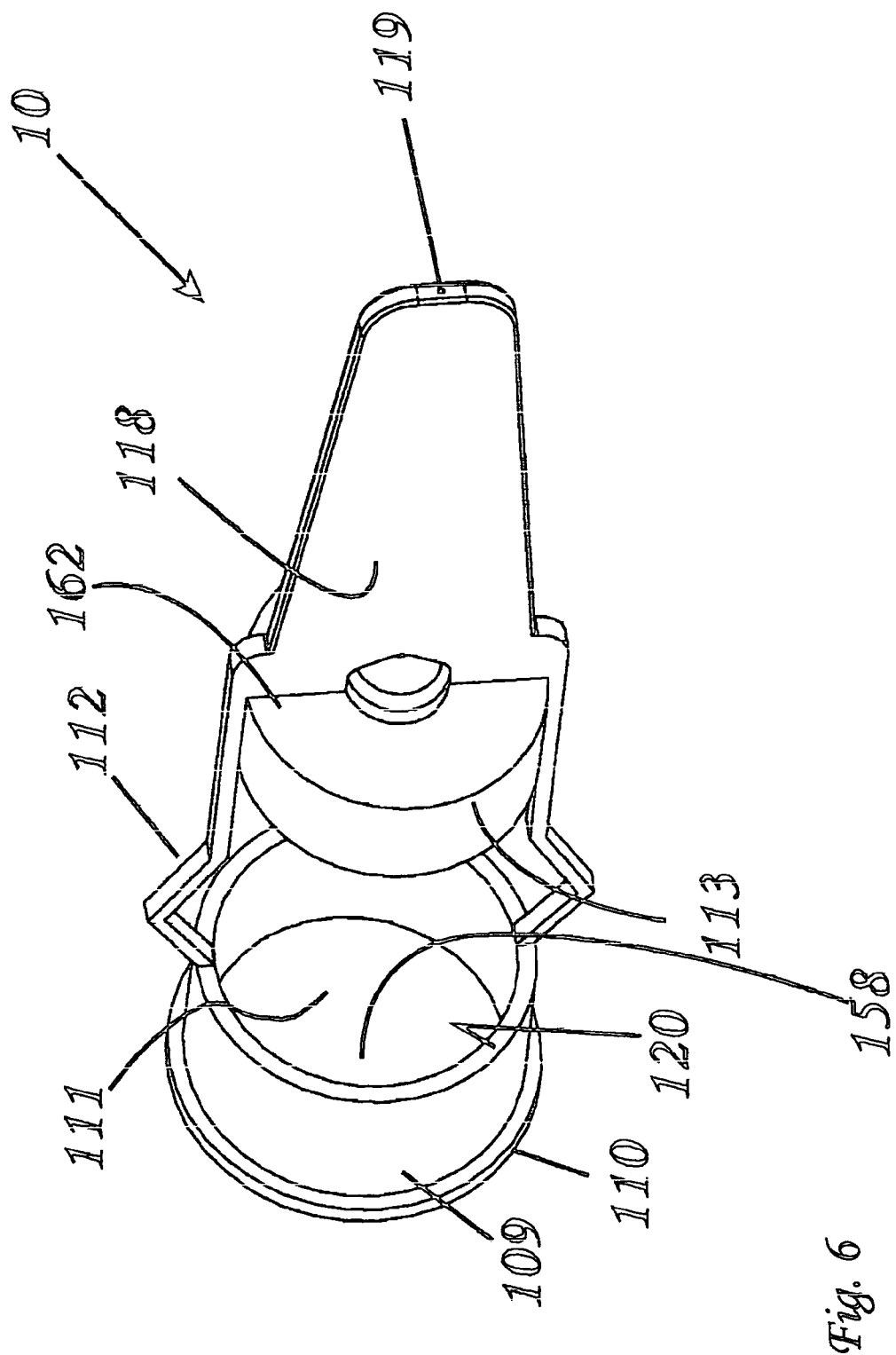
FIG. 6 shows the sealing cap details.
Figure 7:
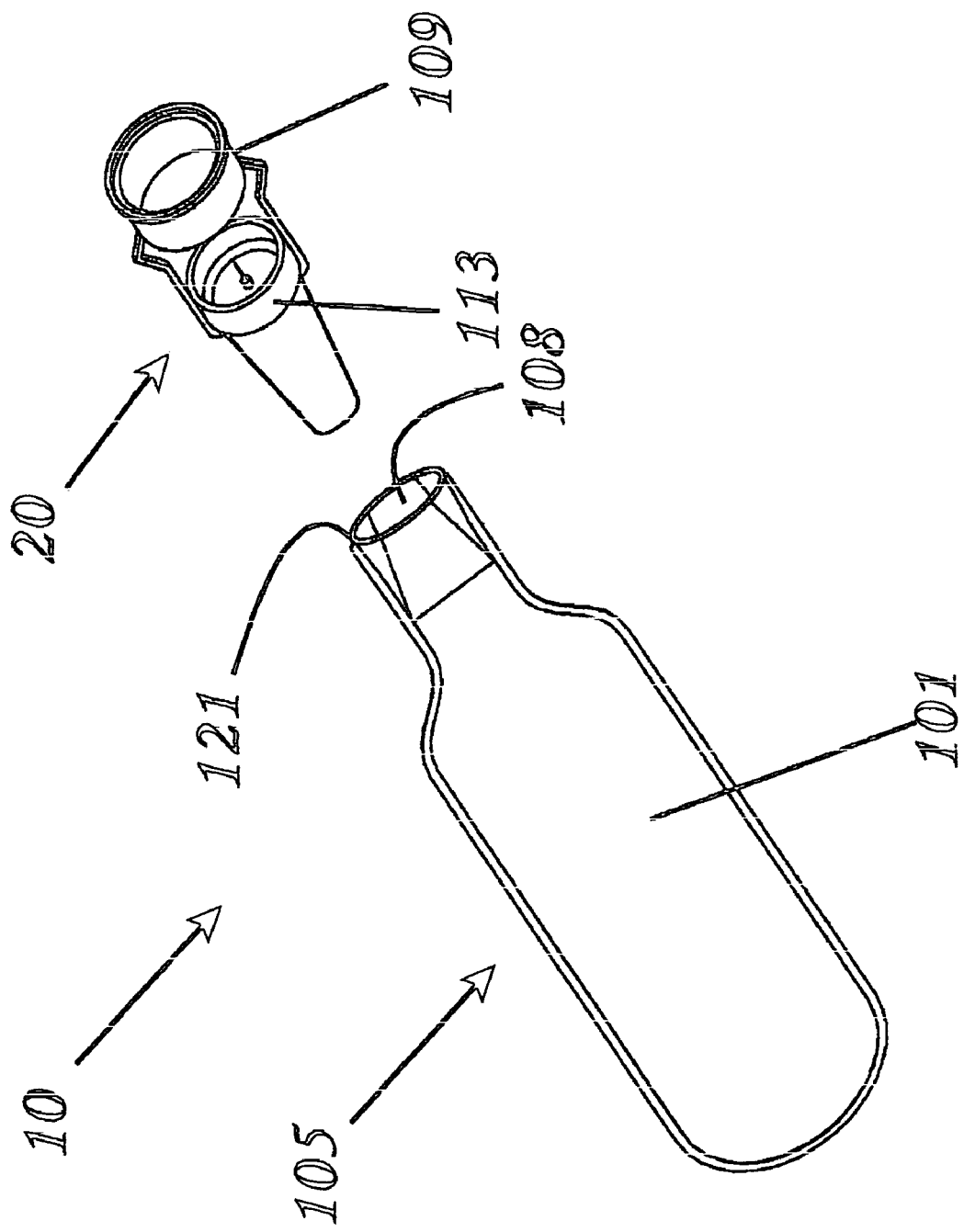
FIG. 7 shows the multilayer receptacle being assembled with the sealing cap.
Figure 8:
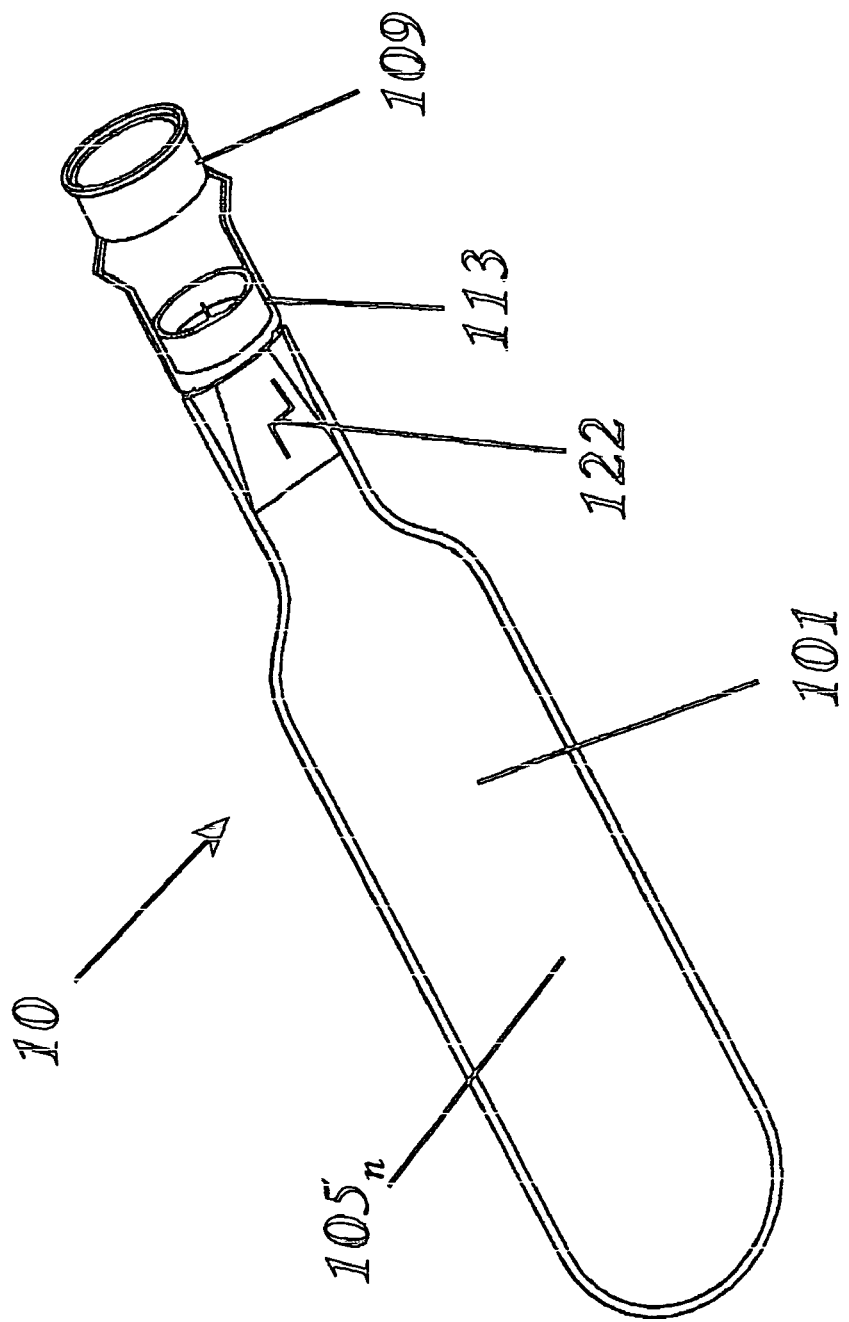
FIG. 8 shows the receptacle assembly.
Figure 9:
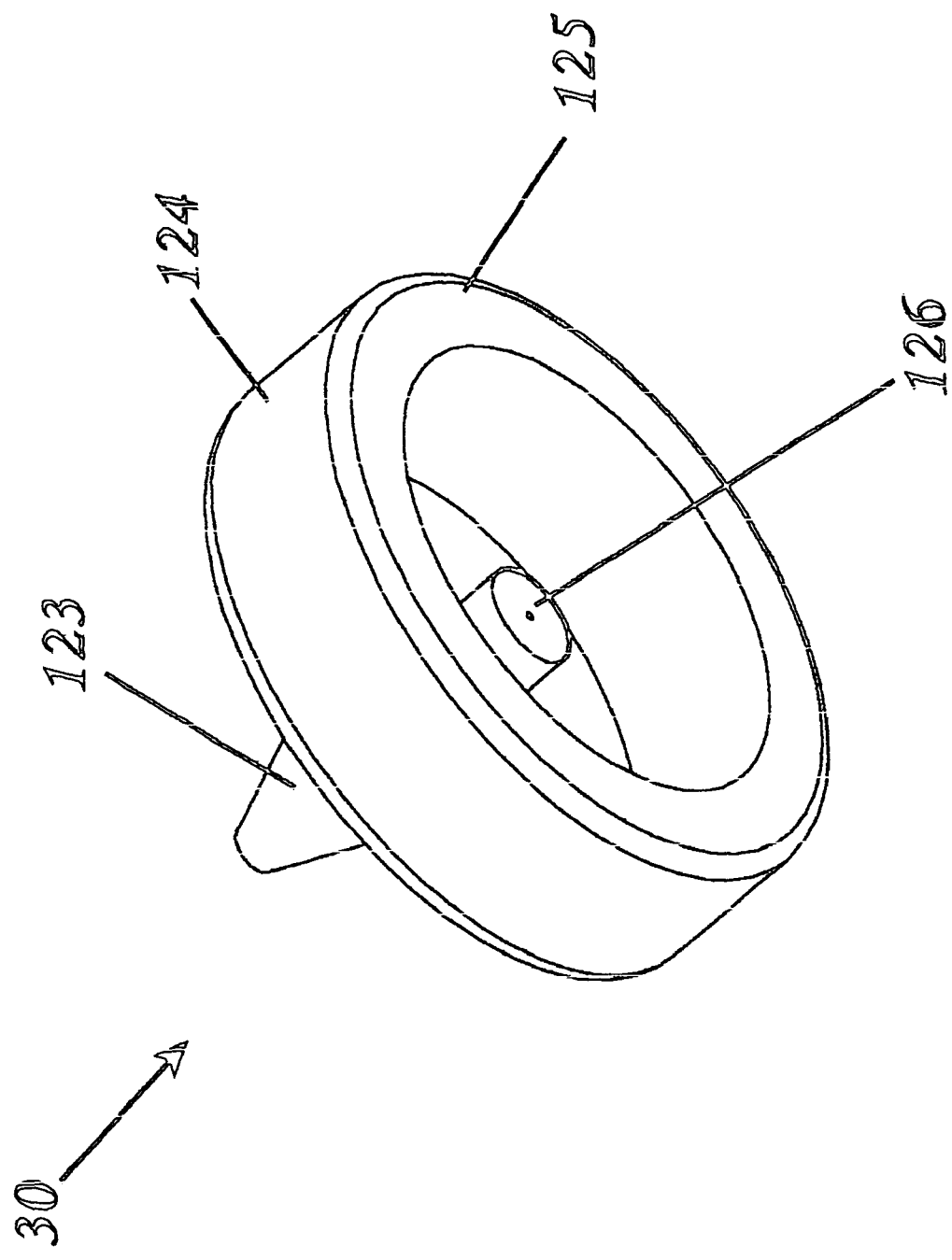
FIG. 9 shows the rubber plug member.
Figure 10:
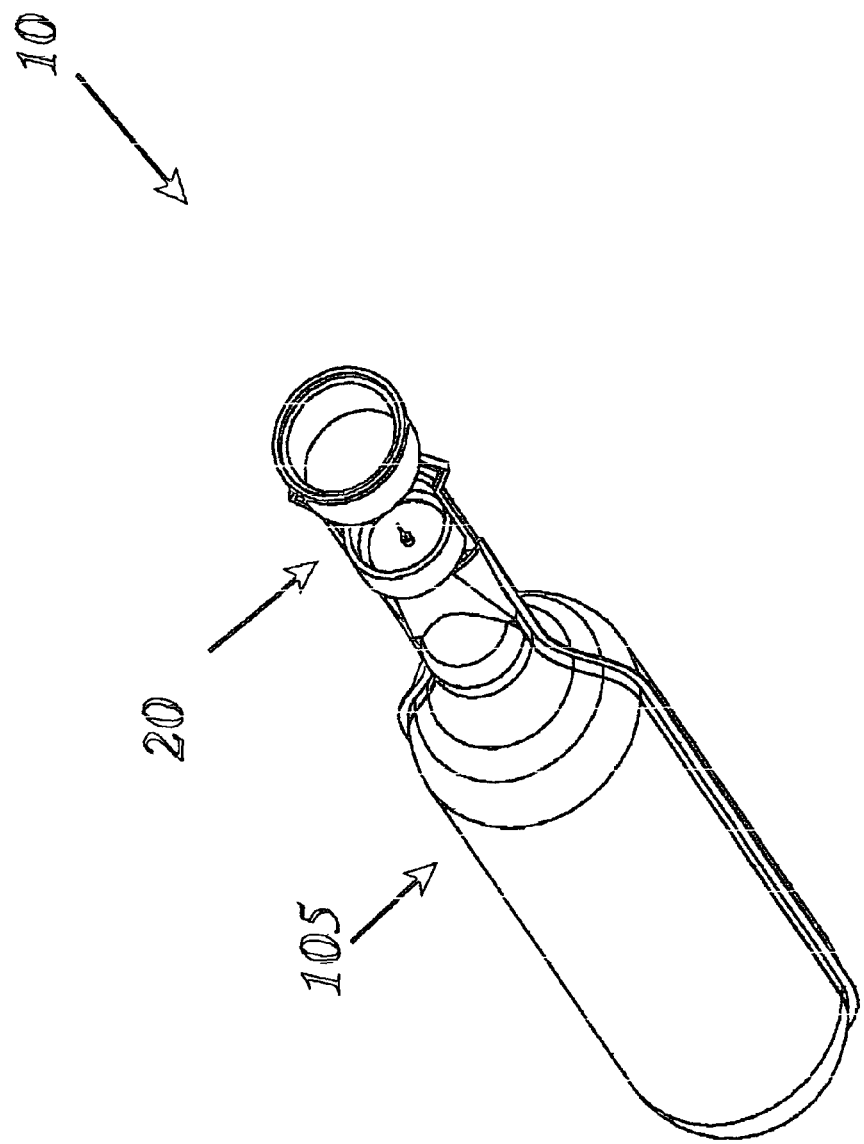
FIG. 10 shows the receptacle assembly in a fully inflated form without showing the bottle.
Figure 11:
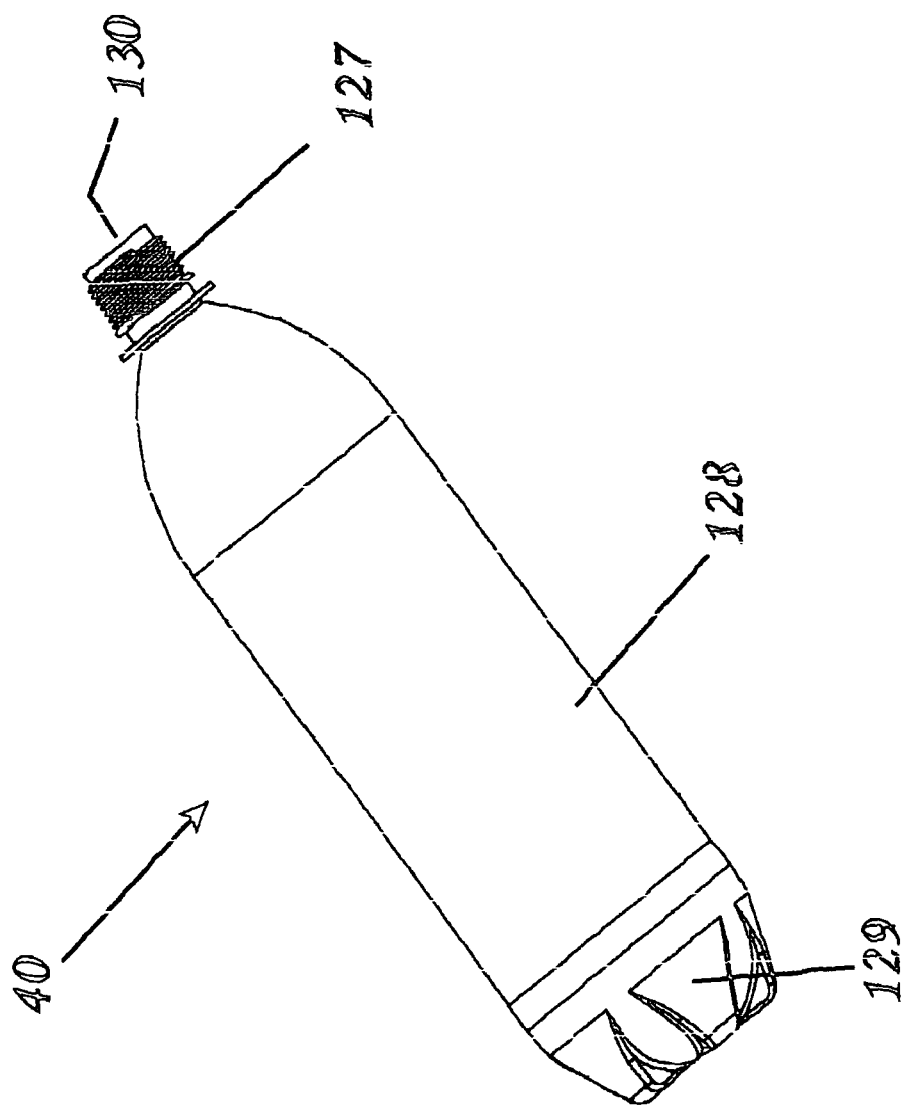
FIG. 11 shows a conventional beverage bottle.
Figure 12:
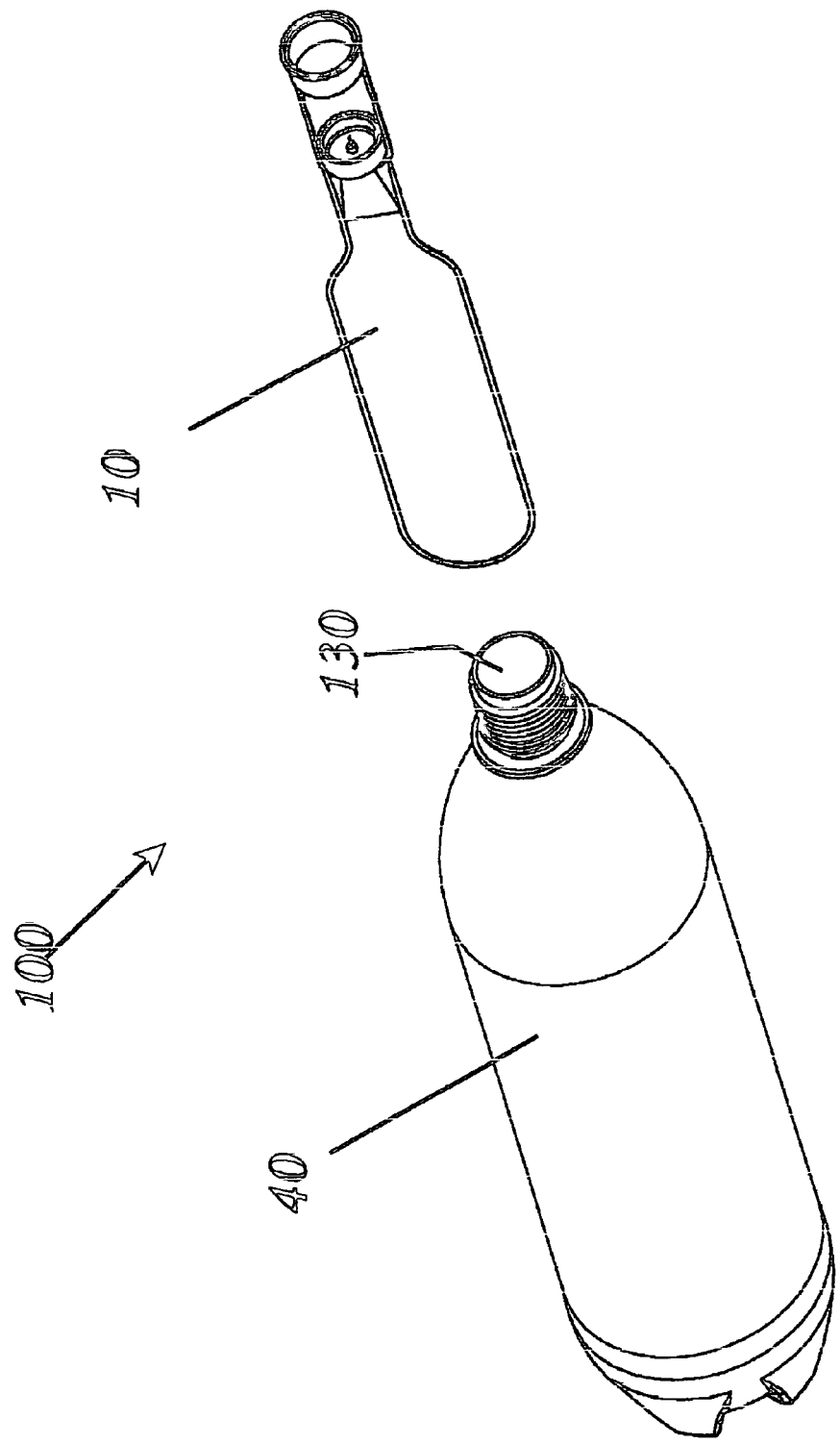
FIG. 12 shows the multilayer receptacle being inserted into the beverage bottle.
Figure 13:
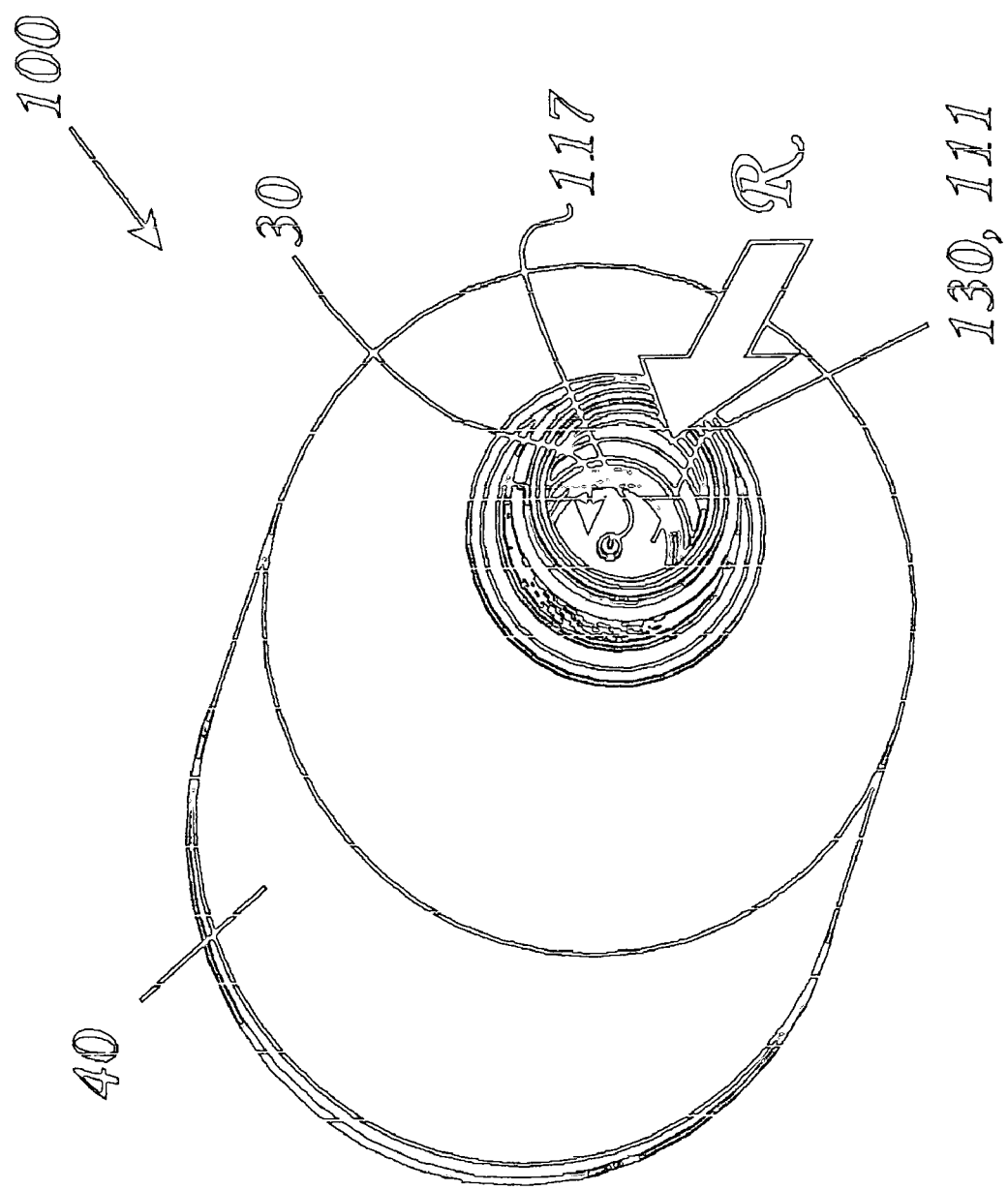
FIG. 13 shows the assembled receptacle and bottle with the refrigerant being charged into the multilayer receptacle assembly.
Figure 14:
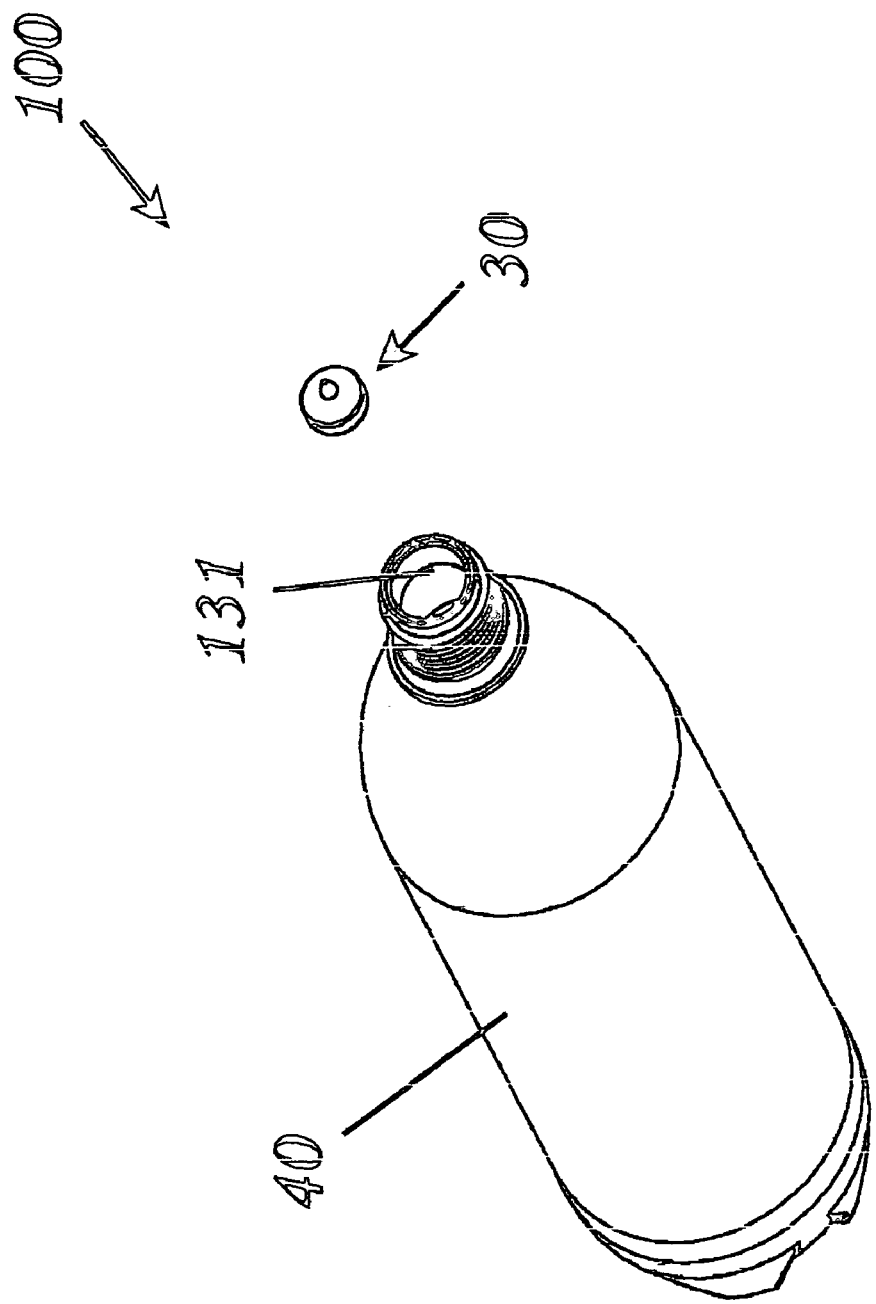
FIG. 14 shows the assembled receptacle and bottle with the refrigerant being sealed off by the rubber plug member.
Figure 15:
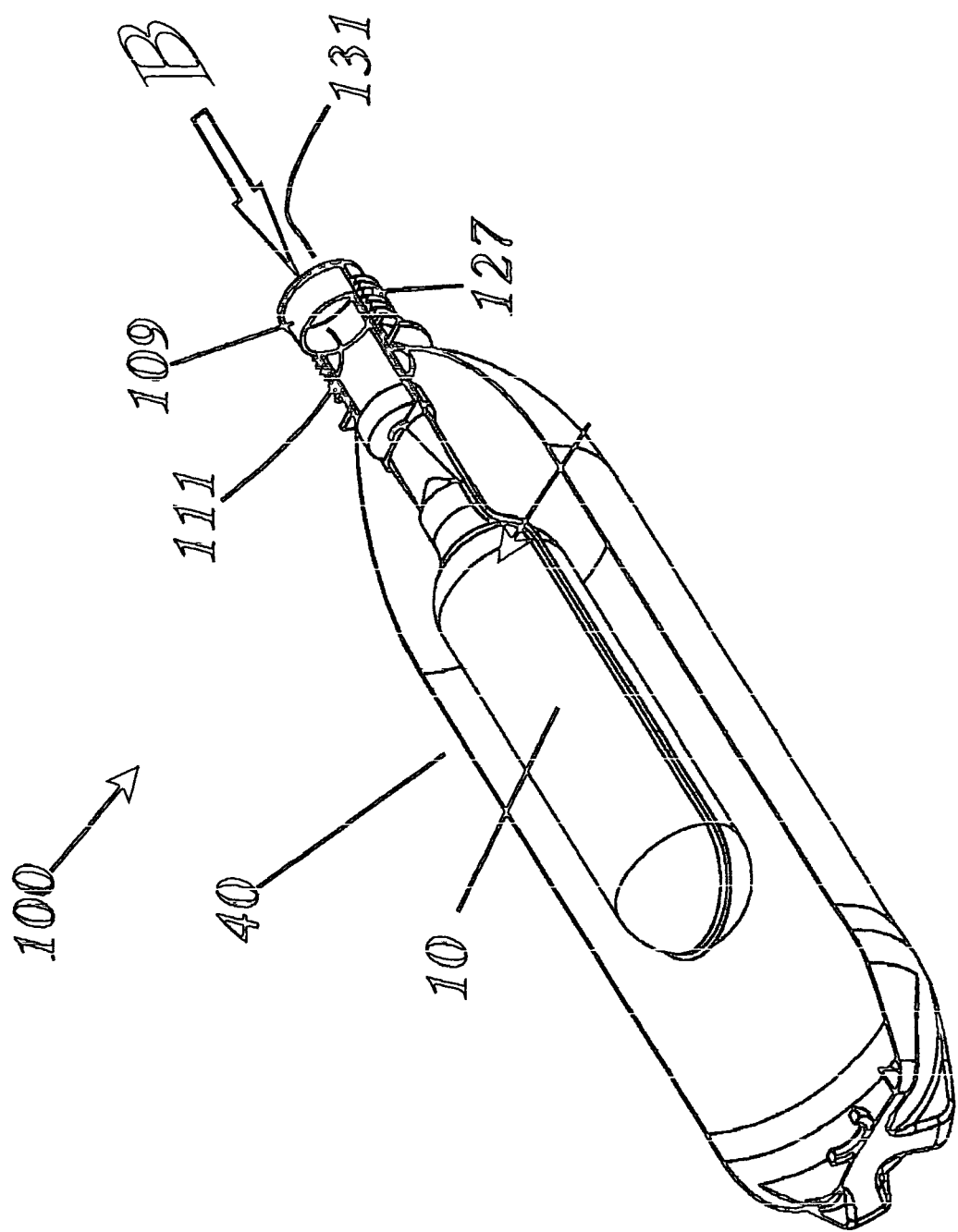
FIG. 15 shows a cut-away view of the apparatus.
Figure 16:
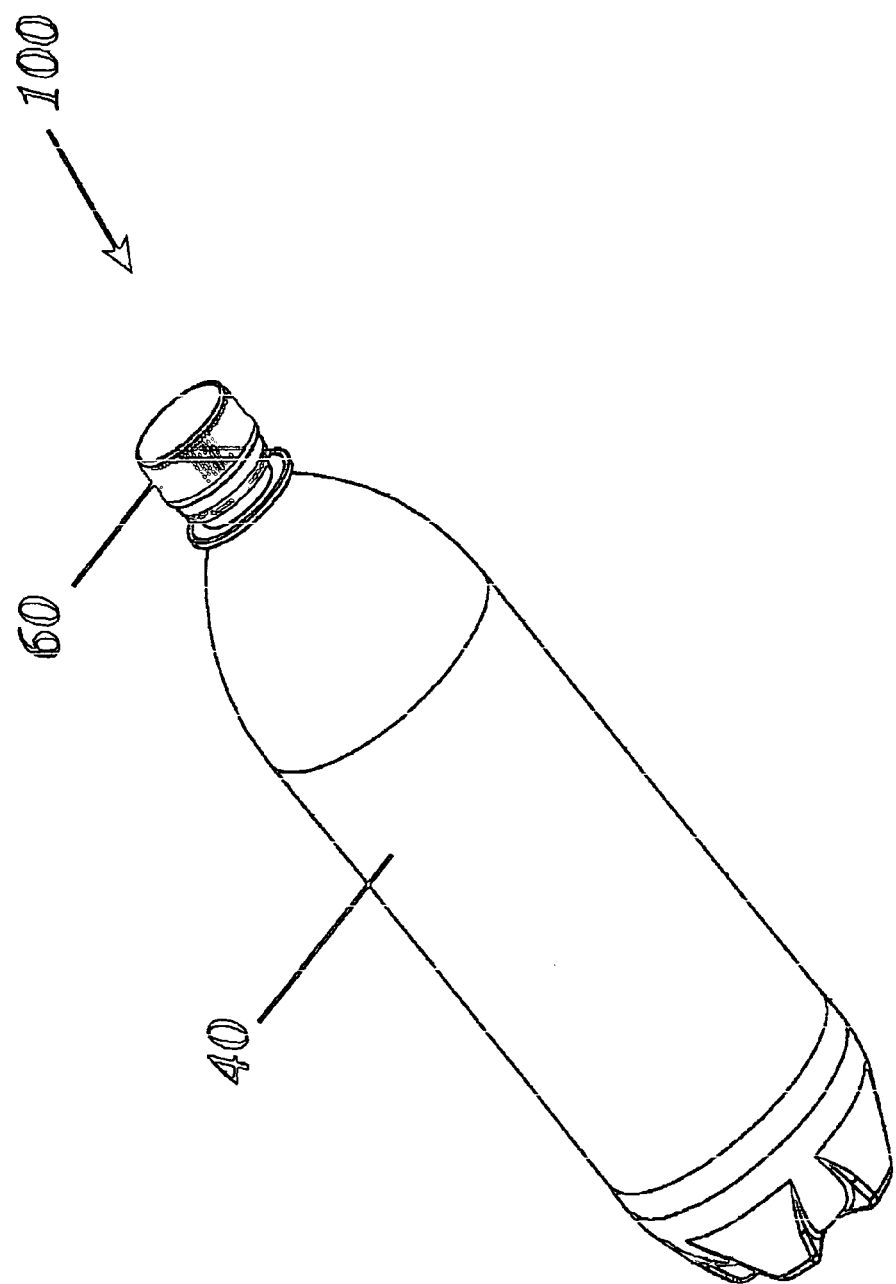
FIG. 16 shows the completed apparatus with the beverage inside the bottle and the cap sealing of the beverage.
Figure 17:
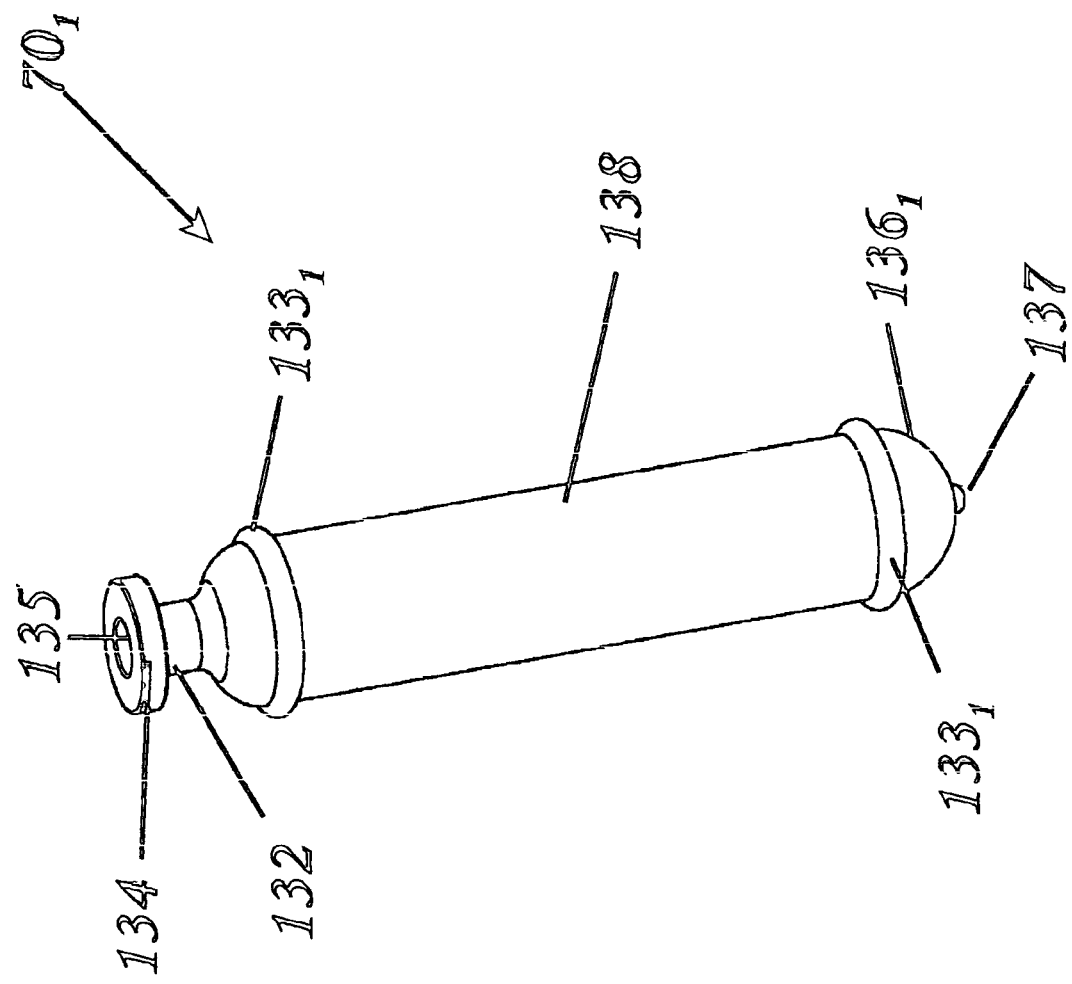
FIG. 17 shows the first of a multiple concentric receptacle members in injection molded form.
Figure 18:
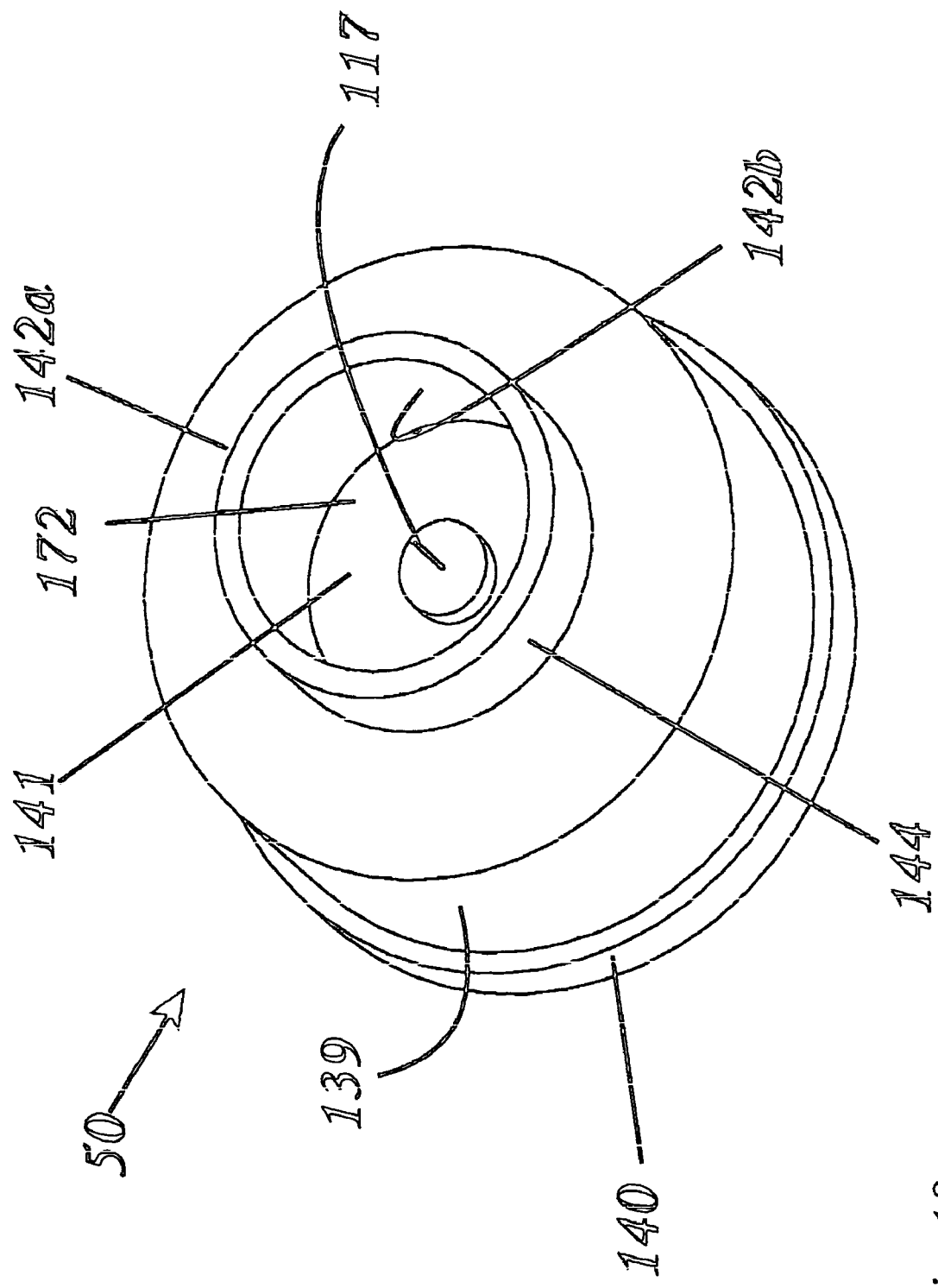
FIG. 18 shows the receptacle plug member.
Figure 19:
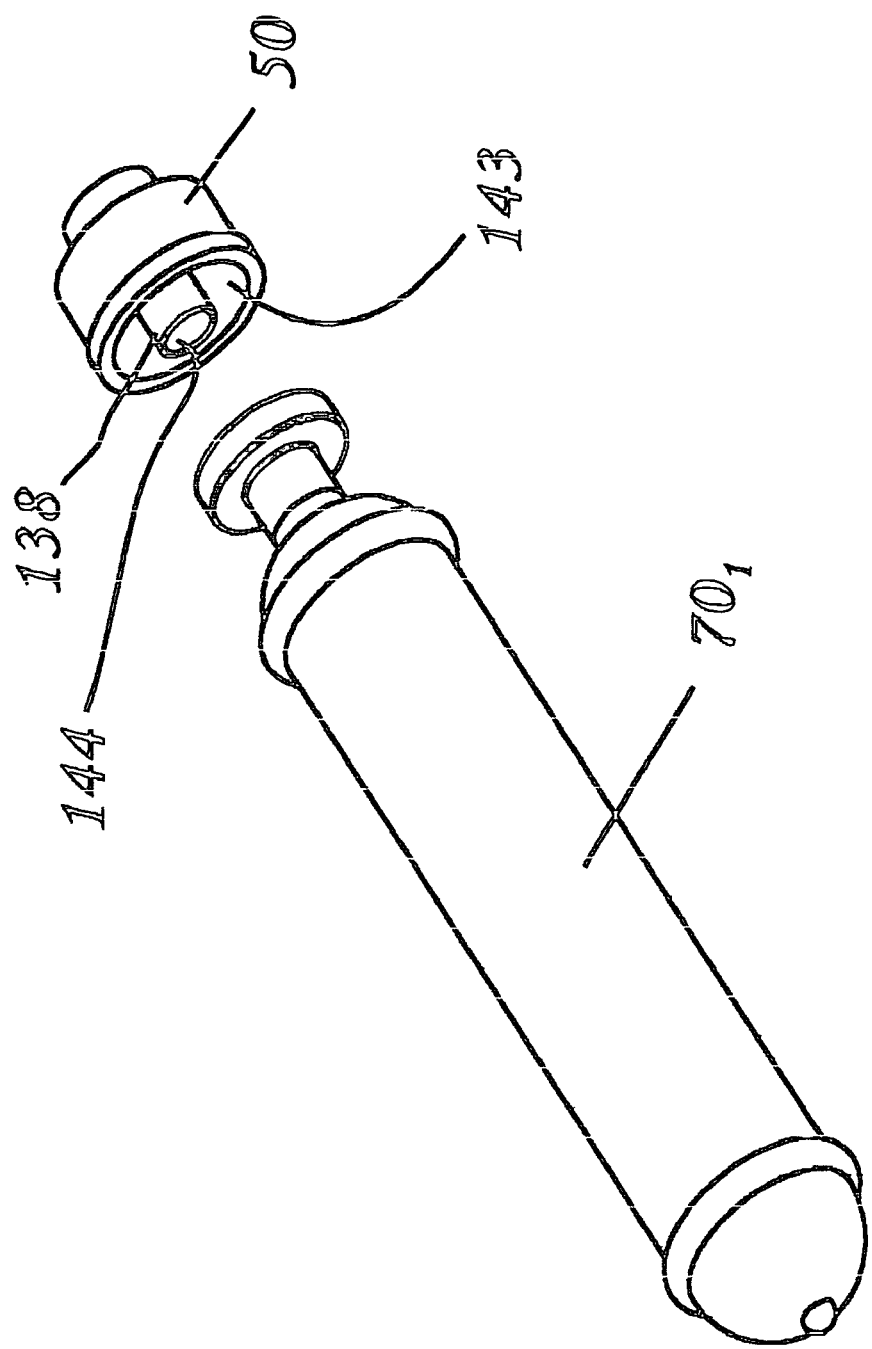
FIG. 19 shows the receptacle plug member being assembled with the receptacle according to the second embodiment of the invention.
Figure 20:
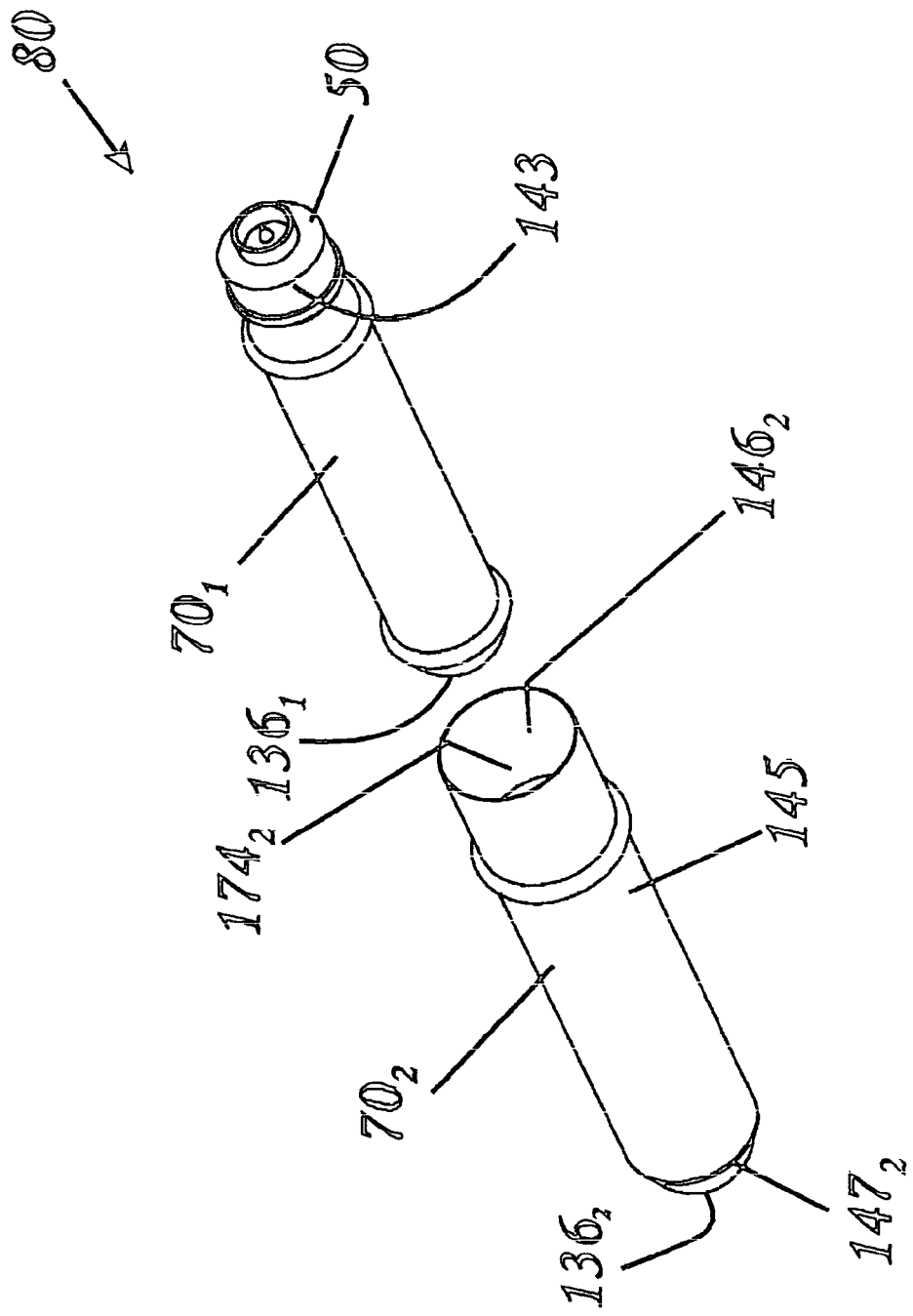
FIG. 20 shows the inner and the second receptacle plug member being assembled with the receptacle according to the second embodiment of the invention.
Figure 21:
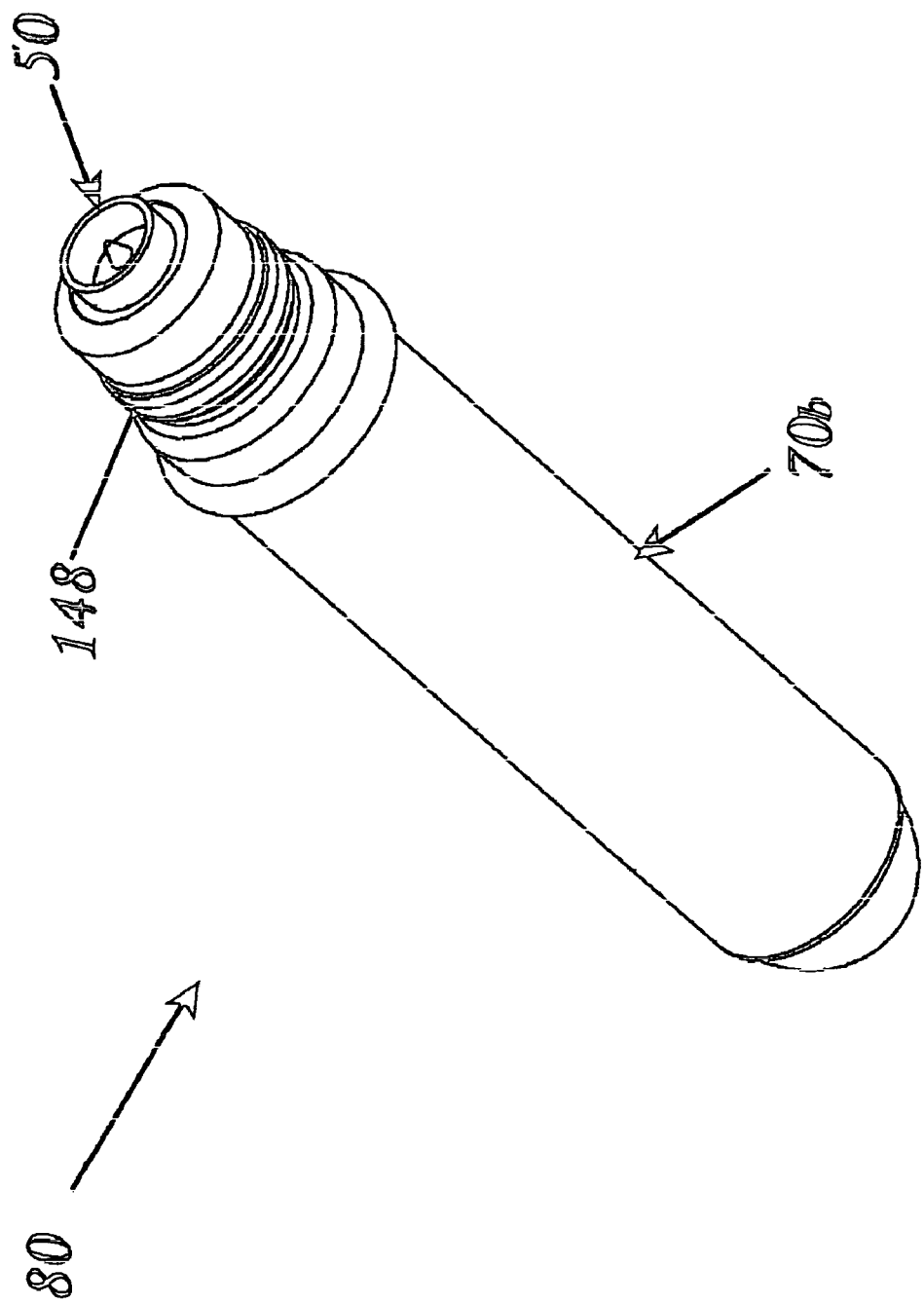
FIG. 21 shows the first assembly of the inner receptacle with the second receptacle forming a pressure support hydraulic chamber.
Figure 22:
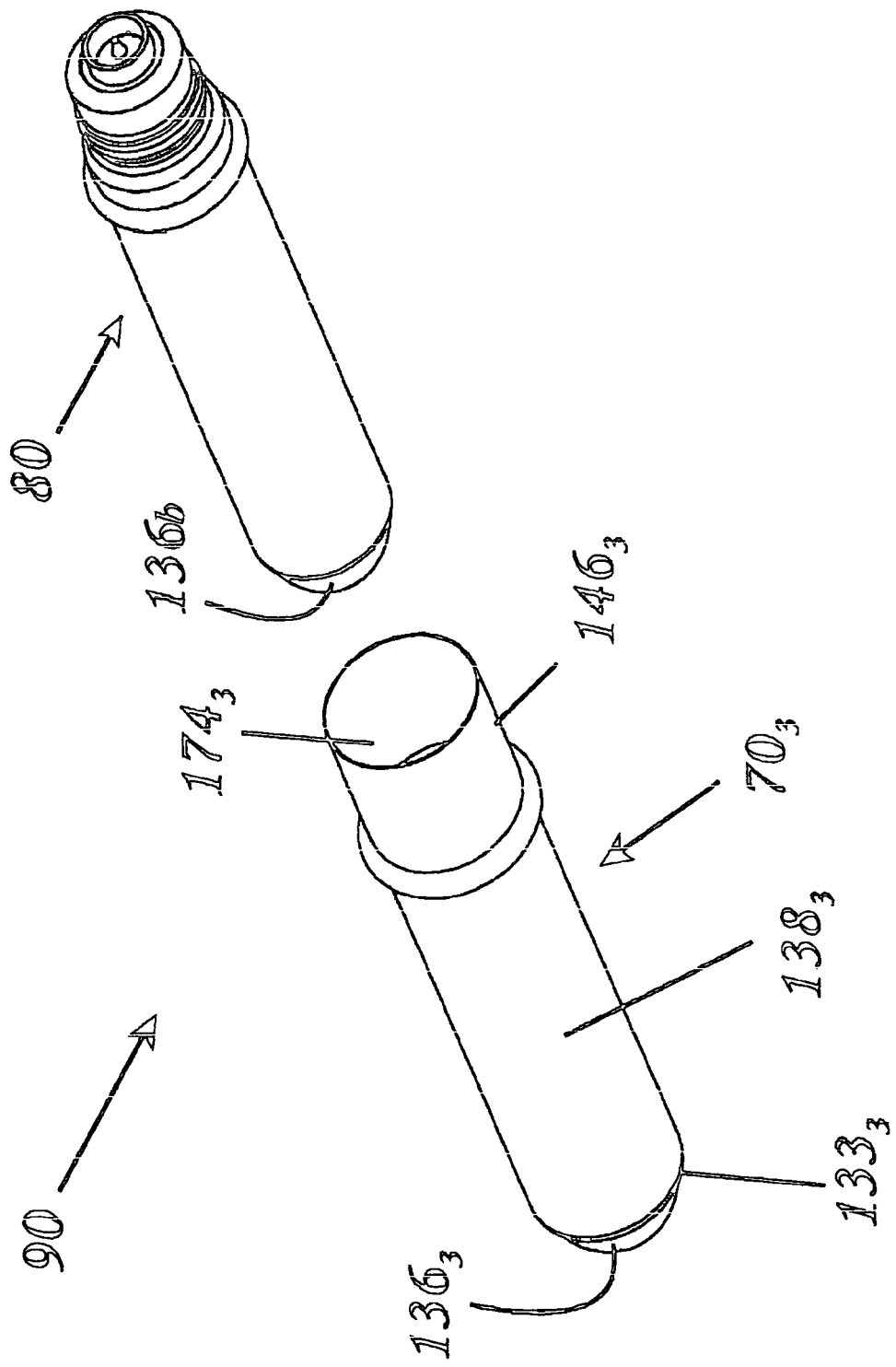
FIG. 22 shows the inner receptacle and the second receptacle subassembly being concentrically placed into the third receptacle member for thermal joining to form a second pressure support hydraulic chamber.
Figure 23:
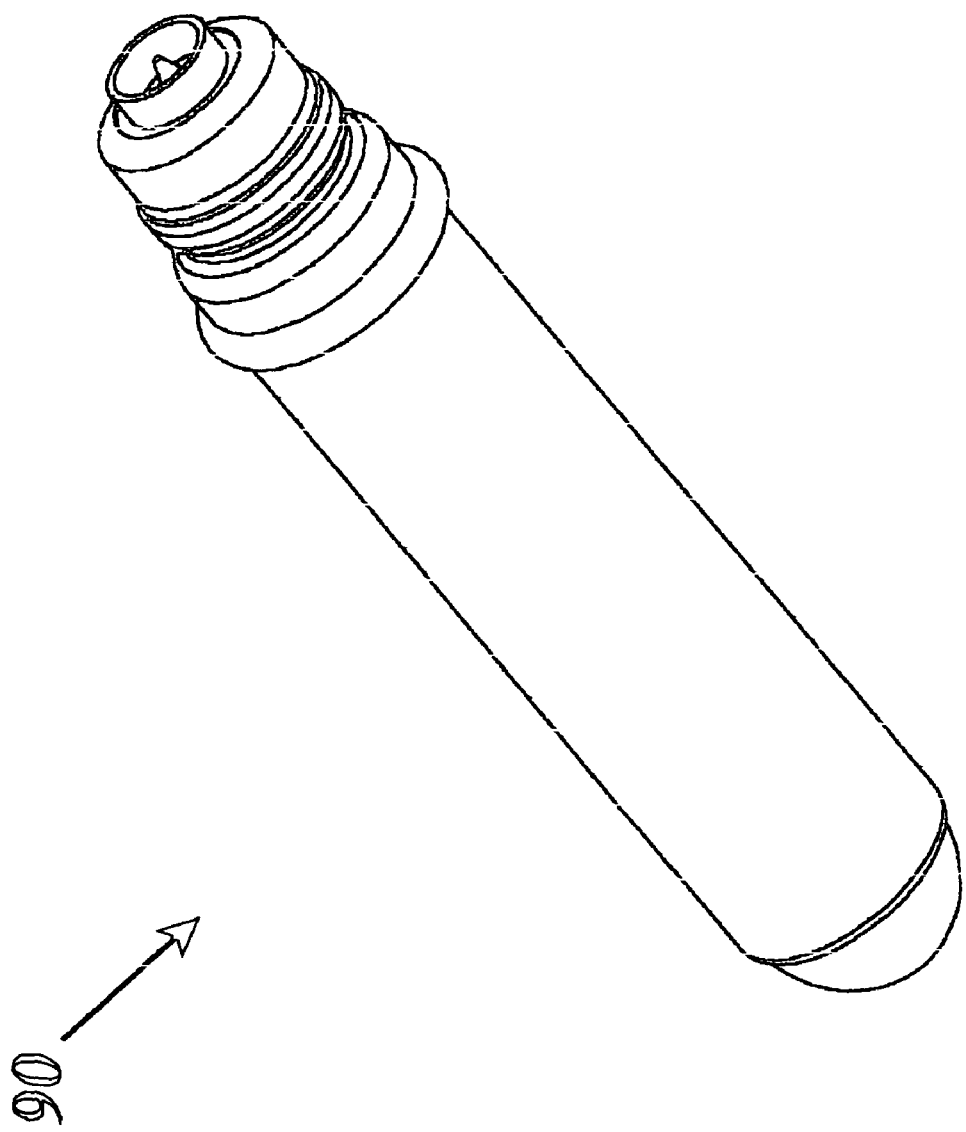
FIG. 23 shows the completed assembly of a third receptacle unto the inner and the second receptacle.
Figure 24:
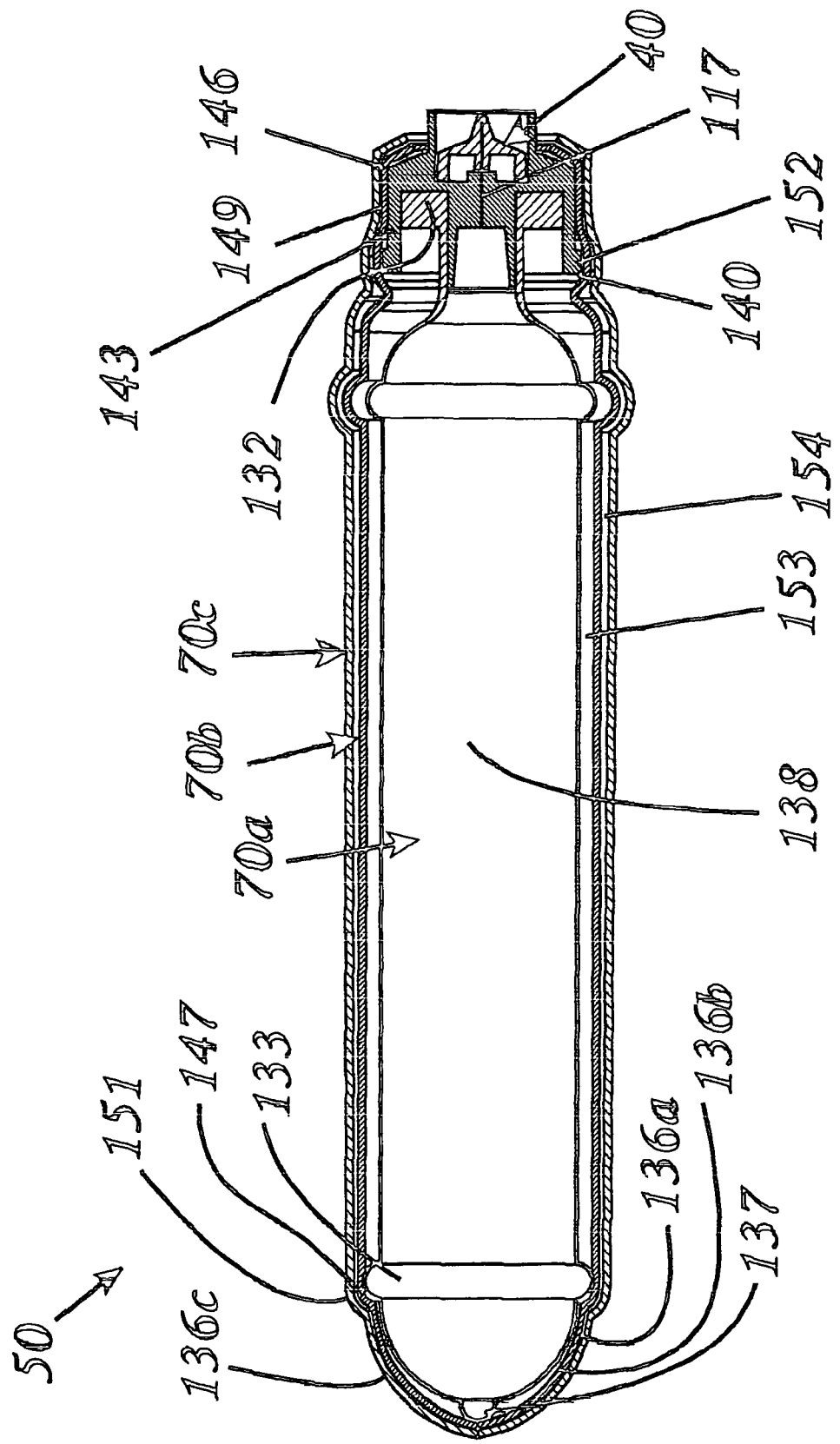
FIG. 24 shows an example of a cross section of the receptacle members with the pressure support hydraulic chambers, the plug and other details.
Figure 25:
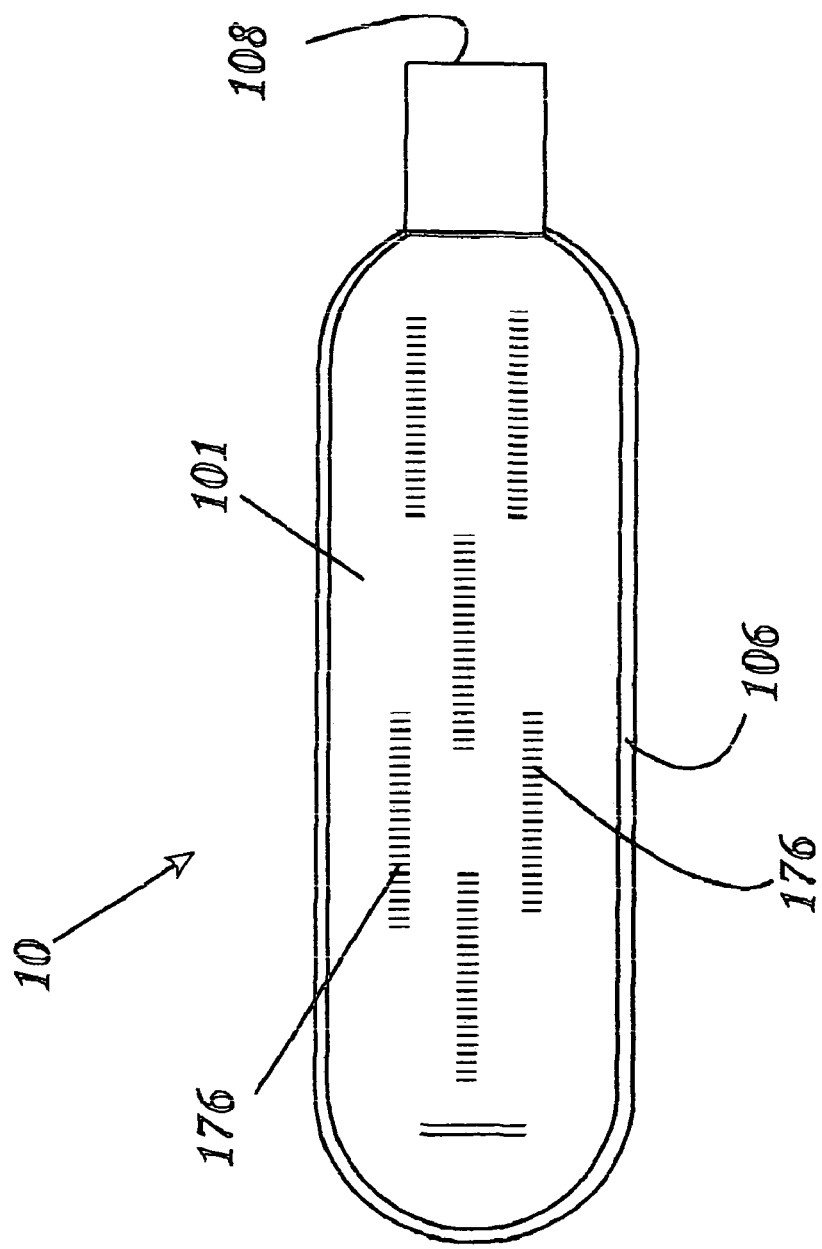
FIG. 25 shows another embodiment of the first embodiment wherein the receptacle members can be co-joined by a pattern thermal sealing die to form strengthening joins for supporting pressure.
Figure 26:
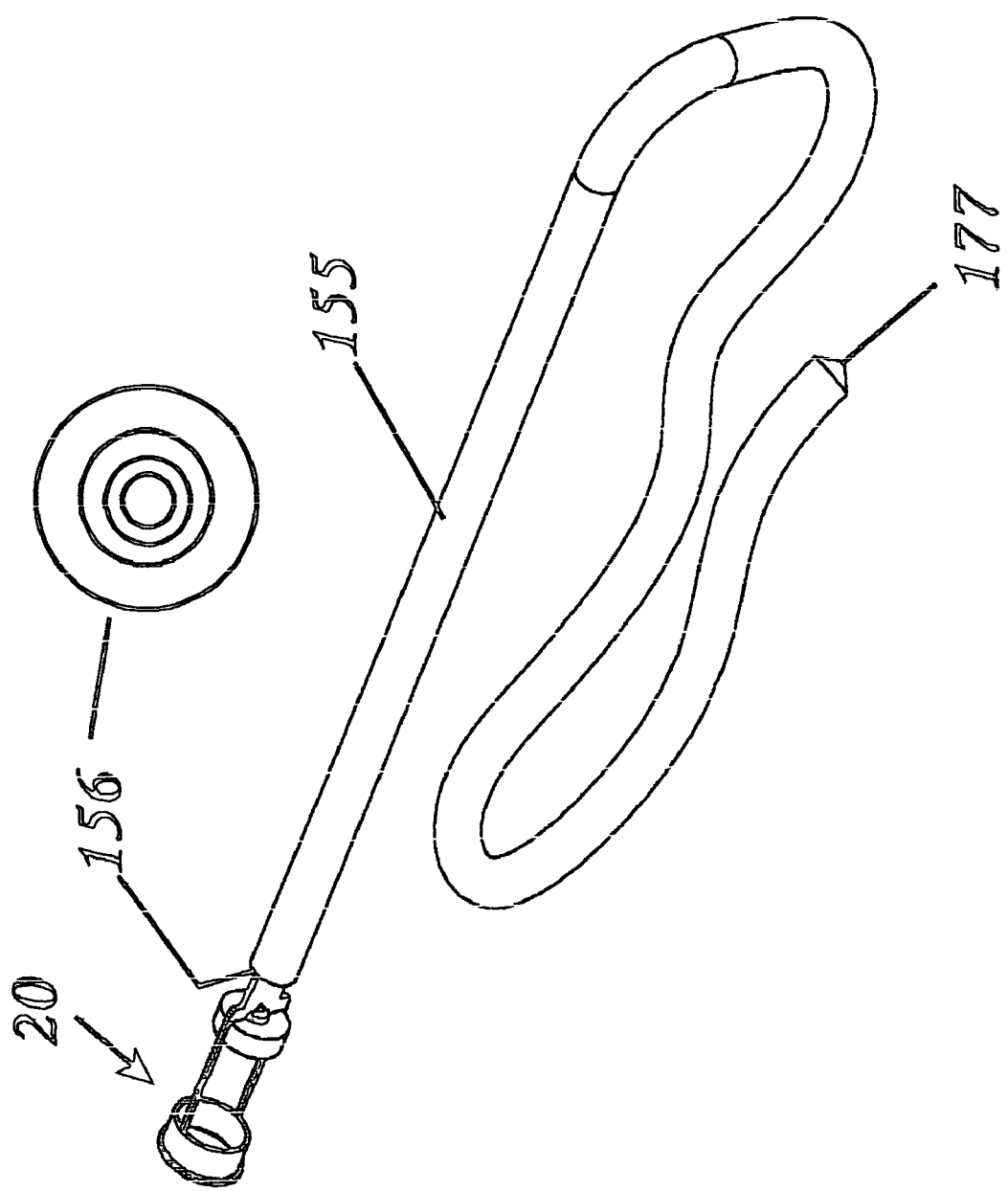
FIG. 26 shows another embodiment of the present invention, wherein a heat shrinkable set of concentric tubes are used to manufacture the apparatus.
Figure 27:
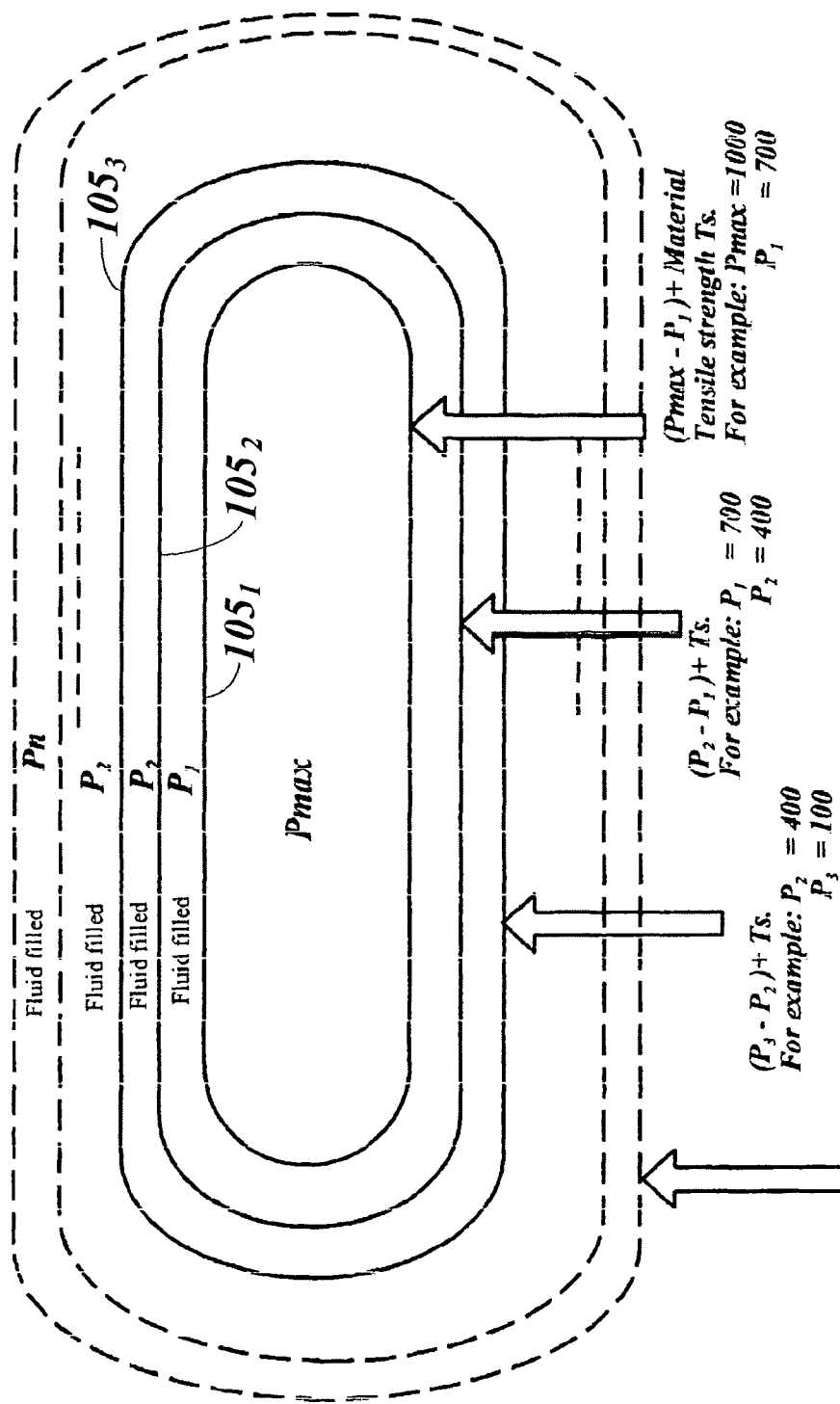
FIG. 27 shows a schematic diagram of the pressure support hydraulic chambers and the principle of operation of the present invention.
Figure 28:
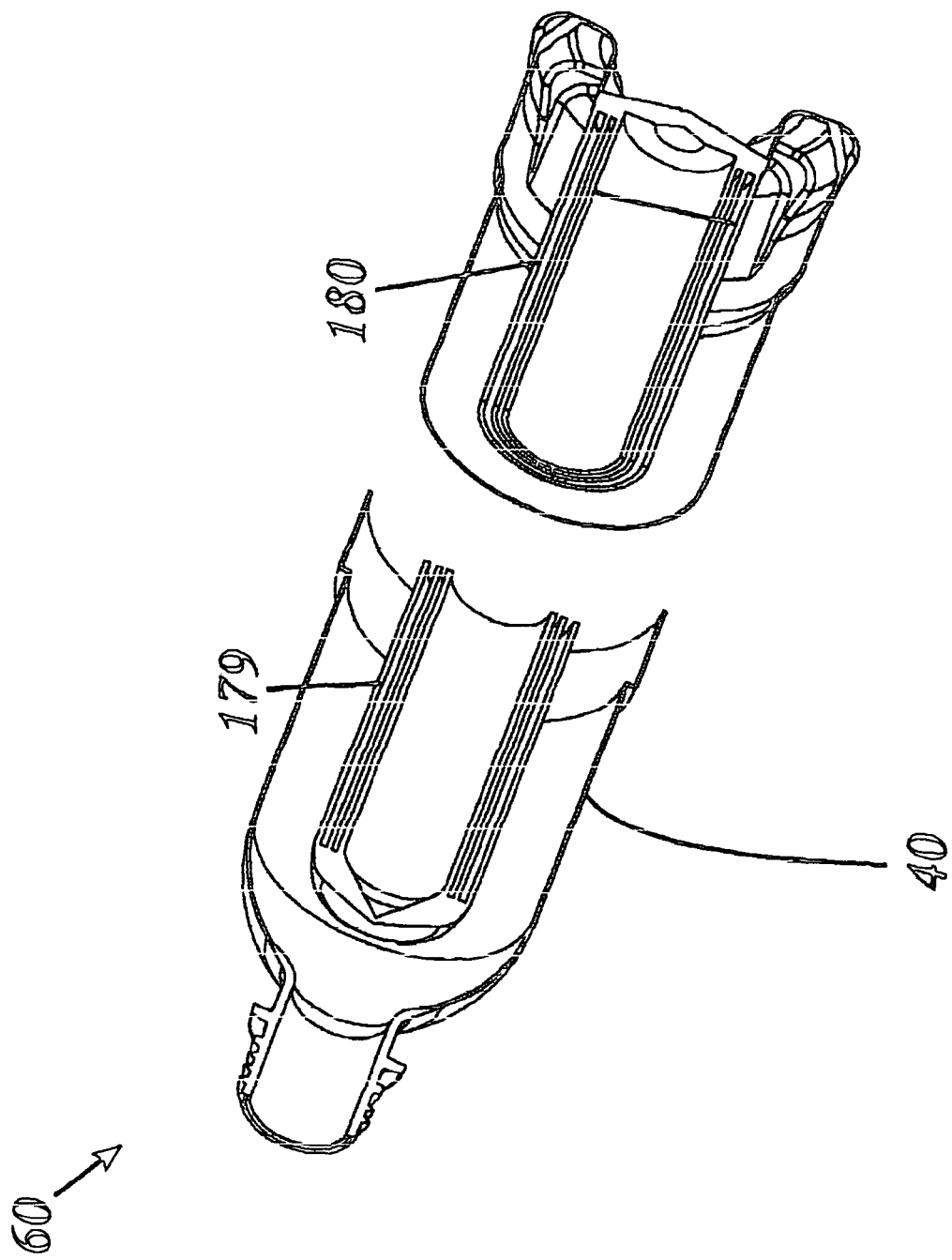
FIG. 28 shows a a two part beverage bottle before fusion.
Figure 29:
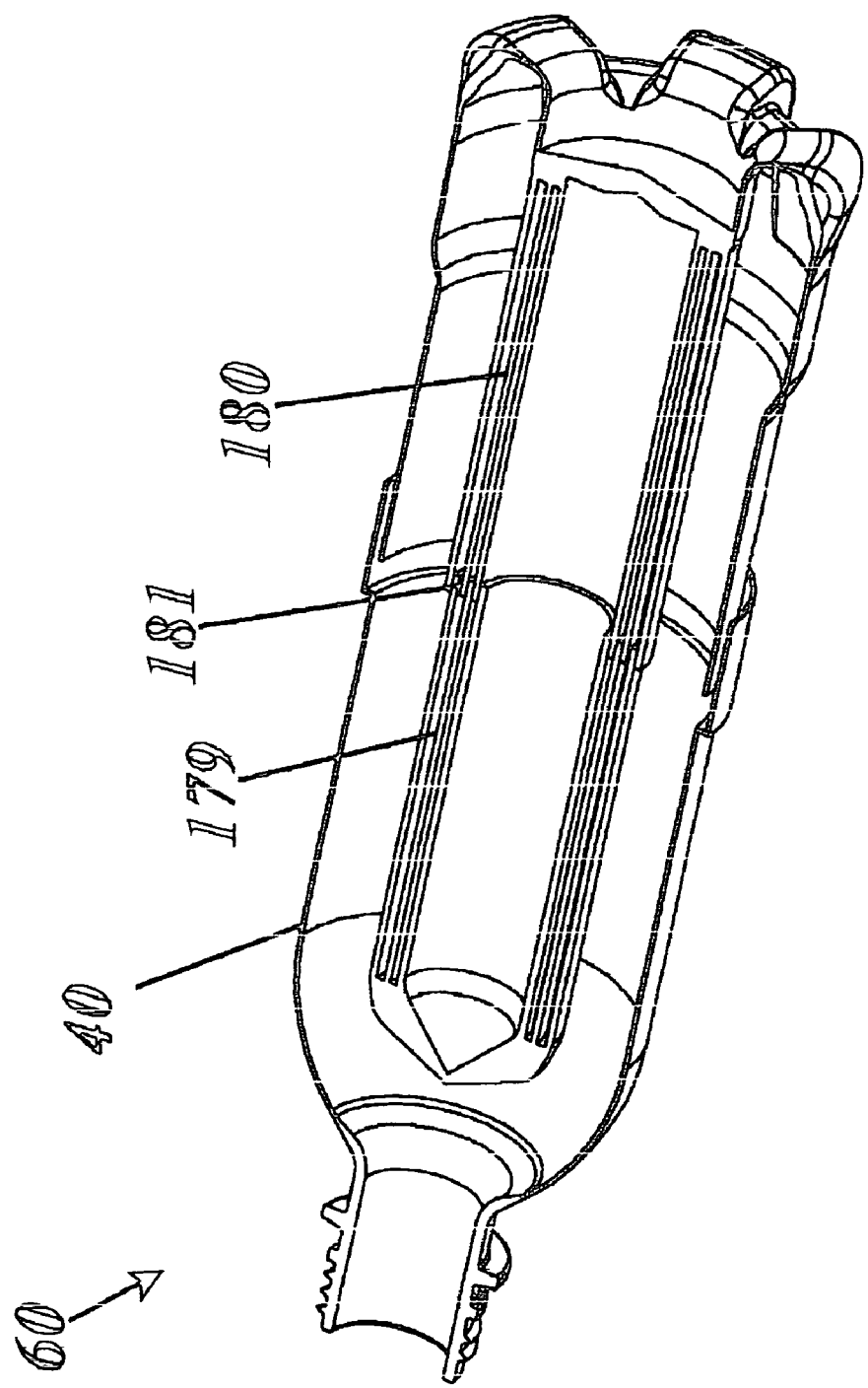
FIG. 29 shows the fused two part injection molded bottle

Referring to figures labeled 1-29, for the preferred of several possible embodiments, the first of several embodiments, apparatus 100 consists of a beverage bottle 40, a beverage bottle cap 60, and a multilayered plastic receptacle assembly 10. Receptacle assembly 10 is made up of a nested number of receptacle members 105 within another up to a number of predetermined receptacles, so that the pressure difference between each receptacle wall is less that the holding pressure of each of the receptacle walls. Advantageously, the flexible multilayer plastic receptacle assembly 10 can be easily then be inserted into any beverage container 40 without difficulty. Beverage container 40 is a plastic bottle with a cylindrical main body 128 with a bottle domed base 129 and an open threaded neck 127. The opening 130 through the open threaded neck 127 allows beverage product B to be filled in beverage bottle 40.

In this first embodiment, the receptacle assembly 10 is made from multiple layers of separated plastic film 101 of pre-determined tensile strength. This multiple layered plastic film 101 could be in the form of a roll 102, so that it can be unrolled and introduced into thermal sealing equipment 103. A thermal sealing die 104 and a thermal die support 107 is used to thermally fuse all the layers around a thermal seal side walls and bottom walls 106 to form the multilayered receptacle assembly 10. It is important that the thermal sealing die 104 be shaped to only seal the receptacle assembly 10 walls 106 and leave a receptacle assembly opening 108 on all the layers. A multilayer plastic receptacle member 10 is thus created in this manner comprising a number of individual but nest receptacle members $105_1$, $105_2$, $105_3$ . . . up to the $n^{th}$ outermost receptacle member $105_n$, wherein each said receptacle member having a receptacle member open end necks $108_1$, $108_2$, $108_3$ . . . $108_n$.

The multilayer plastic receptacle assembly 10 is then cut off and separated from the film roll 102 for further processing. One now has a multilayer plastic receptacle assembly 10 with nested members $105_1$, $105_2$, $105_3$ . . . up to the $n^{th}$ outermost receptacle member $105_n$. I shall refer to the receptacle members jointly as receptacle members 105. The spaces between the receptacle members 105 can be filled with a hydraulic pressure support fluid such as water through the receptacle member open necks $108_1$, $108_2$, $108_3$ . . . $108_n$ jointly herein referenced as receptacle members open neck 108, so that each of receptacle members 105 except for the inner wall 121 of the inner most receptacle member $105_1$ and the outer wall 101 of the outermost receptacle member $105_n$ is fluidly connected to the other by an incompressible fluid. In certain cases, just air may be used to achieve the separation between the receptacle members 105. If each flexible receptacle members 105 wall has high elasticity, then each receptacle members 105 can be made independently instead using a multilayered roll 102, such that each of receptacle members 105 can be sized to expand to a fixed volume that will compress the fluid separating it from the other and generate a pressure gradient of fixed predetermined value. For example, oriented polyethylene-teraphthalate film can be used (stretch-warp film), such that the receptacle members 105 can each expand to a predetermined maximum volume, and then stop expanding.

After manufacture of the multilayered plastic receptacle members 105, a common sealing cap 20 is introduced into the receptacle members open neck $108_1$ and thermally fused with all the receptacle members open necks 108 to form a sealed receptacle assembly 10.

Sealing cap 20 member is designed with a sealing cap cylindrical sleeve 109 around with a sealing cap flange 110 as shown in the figures. A sealing cap opening 111 forms a passageway 158 for refrigerant R and beverage to enter the completed assembly 10. Sealing cap 20 flexible support members 112 protrude from the sealing cap cylindrical sleeve 109 to connect to a sealing cap receptacle sealing cylinder 113. Thus, there are large beverage passages 158 formed between the sealing cap receptacle sealing cylinder 113 and the sealing cap cylindrical sleeve 109. Sealing cap cylindrical sleeve 109 is designed to snugly fit into the threaded open neck 130 of a beverage bottle 40, so that the sealing cap flange 110 rests on the top open edge of the threaded open neck 130 of the beverage bottle 40 so that the rest of receptacle assembly 10 hangs inside the beverage bottle 40. The sealing cap cylindrical sleeve 109 can also be designed to fit on the open rim of a metal can also, so that the large openings 158 will allow beverage B to pass freely into the beverage bottle 40. In the case of a metal can, the diameter of the sealing cap cylindrical sleeve 109 must be large enough to form a snug fit with the rim of the metal container, and the height of the sealing cap flexible members must be adjusted according to the clearances needed for the beverage filling process.

The multiple layer receptacle members open neck 108 is then sealingly fused to the sealing cap member 20 by applying heat to the receptacle members open neck 108 and fusing them to the sealing cap receptacle sealing cylinder 113, so that a hermetic seal is formed between the receptacle members 105 and the sealing cap receptacle sealing cylinder 113. Sealing cap 20 also has a refrigerant charge needle 116 molded directly and concentrically within its body to fluidly transmit refrigerant through the sealing cap 20 into the multilayer receptacle assembly 10. A sealing cap through-hole 119 allows refrigerant R to be introduced through the refrigerant charge needle 116 into the inner receptacle $105_1$ during charging.

Sealing cap receptacle sealing cylinder 113 has a sealing cap receptacle sealing cylinder inner surface 114 that is smooth to form a sealing surface for a rubber plug member 30. A sealing cap receptacle opening support member 118 protrudes from the sealing cap bottom surface 162 and forms a support member for the multilayer receptacle assembly 10 during thermal sealing. After the multilayer plastic receptacle assembly 10 has been formed and thermally or chemically bonded to the sealing cap 20, it can then be inserted into the open threaded neck 130 of the beverage bottle 40, so that sealing cap flange 110 rests on the top surface of the open threaded neck 130 of the beverage bottle 40. The multilayer plastic receptacle assembly 10 is thus freely hanging inside the beverage bottle 40 or metal can after assembly.

The receptacle assembly 10 can now be charged with a refrigerant R inside the beverage bottle 40 so that the refrigerant R pressure $P_{ref}$ will expand the innermost receptacle member $105_1$ and create a pressure force on its walls. The innermost receptacle member $105_1$ will expand in the beverage bottle and reach its pressure holding limit, so that any further pressure will cause the innermost receptacle member $105_1$ to expand within second receptacle member $105_2$ and to compress the fluid chamber outside its wall to a certain excess pressure value $P_2$ against the inside walls of the second receptacle member $105_2$. This excess pressure $P_2$ which is the difference between the refrigerant pressure $P_{ref}$ and the holding stress of the innermost receptacle member $105_1$ will be less that that of the refrigerant pressure $P_{ref}$, and so the pressure $P_2$ now acting on the walls of the second receptacle member $105_2$ is less that the original refrigerant pressure $P_{ref}$. The pressure $P_2$ transmitted to the second receptacle member $105_2$ is less than the pressure of the refrigerant $P_{ref}$ held inside the innermost receptacle member $105_1$ but greater that the holding pressure of the second receptacle member $105_2$ so that the walls of second receptacle member $105_2$ also slightly expand and transmit a new excess pressure $P_2$ to a third receptacle member $105_3$. Since the walls of the second receptacle member $105_2$ hold some of the pressure forces exerted by $P_2$, it will only transmit a lower pressure $P_3$ to the third receptacle member $105_3$. Advantageously, several receptacle members say a number n can be used so that this process of pressure gradient transmission is continued until the outermost receptacle $105_n$ is affected. If the outermost wall 101 of the outer most receptacle member $105_n$ can hold the final pressure difference, then the assembly becomes stable, and no bursting occurs on the receptacle members 105. This way, a pressure gradient is formed by means of the grading of the mechanical stresses due to the tensile strength of the walls that forms each layer of the multiple layer receptacle assembly 10. The general pressure gradient sequence is as follows:

$P_{ref}$ acts on the innermost receptacle wall;
$P_2 = P_{ref}$ –Pressure holding force of innermost wall;
$P_3 = P_2$ –Pressure holding force of second wall;
$P_n = P_{n-1}$ –Pressure holding force of $n^{th}$ wall;

Here, $P_{ref}$ is the refrigerant R pressure, $P_{i=1, 2, 3 \ldots n}$ is the pressure acting on the $n^{th}$ receptacle wall.

It is important that the $n^{th}$ receptacle wall be able to hold the differential pressure across its wall and atmosphere, so that the tensile strength and the cross section of its wall must be capable of holding the pressure $P_n$. Thus, each receptacle wall is essentially capable of holding the pressure differential it experiences and advantageously the apparatus 100 is stable and undamaged.

Apart from a simple linear pressure gradient, any form of the pressure gradient may be employed, for example, a graded pressure gradient in which the pressure is an inverse function of the diameter of the receptacle member may be used. Thus, for example, carbon dioxide with a common pressure of 1000 psi (pounds per square inch) can be stored in the inner most receptacle member $105_1$ and if each receptacle members 105 can be designed to hold a mere 200 psi of pressure and no more, then the pressure gradient will index as follows:

1000 psi→800 psi→600 psi→400 psi→200 psi→atmospheric pressure.

After charging with refrigerant R, a semi permeable rubber plug member 30 is snugly fitted into the receptacle sealing cylinder inner surface 114, so that the rubber plug member 30 mates sealingly with the sealing cap receptacle sealing cylinder inner surface 114 to sit snugly against the bottom surface of receptacle sealing cylinder 115. At the same time, the rubber plug member 30 plugs the refrigerant R charge needle hole 117 preventing refrigerant R from escaping from the receptacle assembly 10. Beverage product B can now be filled into the beverage bottle 40 through the threaded open neck 130 of the beverage bottle 40, and through the sealing cap cylindrical sleeve 109, by passing it through the beverage passageways 158 and into the beverage bottle 40. The beverage bottle 40 is sealed with a beverage cap 60 and carbonation pressure build therein so that the rubber plug member 30 experience said pressure. Since the rubber plug member 30 forms an air chamber 172 with the sealing cap 20 and it is slightly permeable to carbonation gases, the carbonation gases will enter into the air chamber 172 and fill it with pressurized carbon dioxide or nitrogen. When the beverage cap 60 is opened, the carbonation pressure loss outside the rubber plug member 30 causes the rubber plug member 30 to be pushed away from the needle 116 and the refrigerant R escapes through the needle 116 into the atmosphere. The beverage product B is then cooled by the evaporation of the refrigerant R from the multiple layer plastic receptacle assembly 10 and the beverage product B is chilled.

In a second embodiment of several others, a multiple receptacle assembly 90 is disclosed, with an inner first receptacle member $70_1$ of cylindrical form having an inner receptacle cylindrical body $138_1$ unified with an inner receptacle cylinder base dome $136_1$. The inner receptacle cylindrical body 138 terminates at an inner receptacle open neck 135 where an inner receptacle flange 132 is formed. The inner receptacle cylindrical base dome $136_1$ has a small bulge 137 that is used to act as a spacer for the second receptacle member $70_2$. An inner receptacle alignment ridge $133_1$ on the inner receptacle cylindrical body 138 is used to space a second receptacle member $70_2$ from the said inner receptacle member inside walls 138.

A receptacle plug member 50 consists of a receptacle plug cylindrical body 139 terminating on a receptacle plug top wall 141. A receptacle plug cylinder 144 protrudes from the receptacle plug top wall 141, to form an air chamber 172. The air chamber 172 forms a seat for the rubber plug member 30 mentioned earlier. A receptacle plug sealing edge flange is formed on the lower open edge of the receptacle plug outer cylindrical body 139. A receptacle plug cylinder 144 protrudes concentrically from the inside of the receptacle plug top wall 141 terminating on an open sealing edge 138. During assembly, the receptacle plug member 50 is sealingly inserted into the inner receptacle opening 135 to form a receptacle subassembly 80. The air chamber 172 now faces outward ready to receive the rubber plug member 30. A needle 116 is also molded into the body of the receptacle plug member 50, to form a fluid communication between the inside of the inner receptacle $70_1$ and the outside of the receptacle plug member air chamber 50.

To assemble the apparatus, a second receptacle member $70_2$ is introduced. The second receptacle member $70_2$ comprises a second receptacle cylindrical wall $138_2$ sealingly connected to a second receptacle base dome $136_2$. A second receptacle alignment ridge $133_2$ connects the second receptacle base dome $136_2$ to the second receptacle cylindrical body $138_2$. The second receptacle cylindrical body $138_2$ terminates in a second receptacle open neck $146_2$. The inner receptacle subassembly 80 is inserted into the second receptacle open neck $146_2$ so that the inner receptacle spacing bulge 137 rests on the inside cavity $174_2$ of the second receptacle base dome $136_2$. The inner receptacle alignment ridge $133_1$ a keeps the two receptacles separated by a concentric space, so that a fluid such as water can be filled into this space as a hydraulic support chamber $153_1$. Heat is then applied to the second receptacle open neck $146_2$ of the second receptacle $70_2$. The heat causes this wall to form a shrink and seal $148_1$ over the compress over the receptacle plug sealing flange 140 to seal-off the inner hydraulic support cavity $153_1$ and thus form assembly 80. Thus, fluid is trapped between the inner receptacle member $70_1$ and the second receptacle member $70_2$ in this inner hydraulic support cavity $153_1$.

A third receptacle member $70_3$ can then be placed following a similar process as outlined above to form a second hydraulic support chamber $153_2$, and then a third or fourth hydraulic chamber can be constructed until the $n^{th}$ hydraulic chamber $153_n$ is formed as required. In the case a third receptacle member $70_3$ is used for example, it will consist of a third receptacle cylindrical body $138_3$ terminating in a third receptacle open neck $146_3$. A third receptacle alignment ridge $133_3$ is also provided and functions for the same purposes as mentioned for the first and second receptacle members. Similarly, the subassembly 80 inner and second receptacle members is inserted to the inside cavity $174_3$ of the third receptacle member and then heat sealed with the second and third receptacle around the third receptacle neck opening $146_3$ to form a seal clamp $148_2$ over the assembly 80 and thus form assembly 90. Thus, a second hydraulic pressure support chamber $153_3$ is formed.

The completed unit can then be charged with refrigerant R through the needle 116 and the rubber plug member 30 placed snugly into the receptacle plug air chamber 172 inside wall 142b to plug off the needle 116 opening. The assembled apparatus 90 can then be inserted into a beverage bottle 40 to form apparatus 100 and can either be attached to beverage bottle 40 or a beverage can as per prior embodiments, or can be made to freely float inside the beverage bottle 40.

In yet a third embodiment of the present invention, the receptacle members could be formed in the shape of small concentric tubes members 155 whose multiple concentric layers 156 are spaced apart by a hydraulic fluid or air. Tube members 155 could be made from a heat shrink material such as polyethylene-teraphthalate (PET) of from PVC. In this case, the tube ends 157 are sealed by heat shrinking over the multilayer sealing cap member 20 or alternatively they could thermally bonded with the multilayer sealing cap member 20 which can be made to a suitable size and shape. The open ends of the tube members are then sealed to form sealed tube ends 177.

In yet a fourth embodiment of the present invention, the multiple layered receptacle member of the first embodiment can be thermally fused at various fused pressure support joints 176 so that it can handle more pressure. This is simply achieved by a modification of the thermal sealing die 104. The assembly can then be inserted into a beverage bottle 40 to form apparatus 100 and can either be attached to beverage bottle 40 or a beverage can as per prior embodiments, or can be made to freely float inside the beverage bottle 40.

In yet a fifth embodiment of the invention, a three part bottle assembly 60 is used to construct the apparatus. The first part is a base of the bottle 40 constructed with a bottom multiple hydraulic chamber 180 by injection molding. Then, a top multiple hydraulic chamber 179 is constructed separately. The apparatus 60 is assembled by bonding the top multiple hydraulic chamber 179 to the bottom multiple hydraulic chamber 180 along the open edges 181. This can be achieved by either UV cured epoxies or by laser welding using a new process developed by Dymax Corporation USA. Once the two parts are fused together, one now has a completed multiple chamber hydraulically supported canister that functions just as described in the previous embodiments. Then one fuses the top part of the bottle 40 to the lower half to form a completed apparatus.

What is claimed is:

1. A self-cooling container comprising
an outer housing including an opening;
a removable outer cap sealing the opening of the outer housing;
a sealing cap including a ring-shaped portion and a refrigerant releasing aperture held within the outer housing;
a receptacle attached to the sealing cap, including an inner receptacle member and a plurality of nested receptacle members, each including a side wall, an open top, and a closed bottom, extending outward from the inner receptacle member, wherein the inner receptacle member has a closed bottom and an open top fastened to extend around the ring-shaped portion of the sealing cap, and wherein a top edge of each of the nested receptacle members is sealed to the open end of the inner receptacle member,
a refrigerant held under pressure within the inner receptacle member
a beverage held within the outer housing; and,
a refrigerant releasing structure holding the refrigerant releasing aperture closed while the outer cap seals the opening of the outer housing and opening the refrigerant releasing aperture when the outer cap is removed from the opening of the outer housing.

2. The self-cooling container of claim 1 wherein
the beverage is held within the outer housing under pressure,
the sealing cap includes a passage for moving the beverage past the sealing cap,
the refrigerant releasing structure includes a stopper having a sealing surface held-by pressure within the outer housing against an end of the refrigerant releasing aperture to close the refrigerant releasing aperture closed,
the stopper is composed of a permeable material allowing a gas held under pressure within the beverage to move into a space between the stopper and the outer cap, and
the sealing surface is moved away from the end of the refrigerant releasing aperture when the outer cap is removed from the opening of the outer housing to release pressure within the outer housing.

3. The self-cooling container of claim 1, wherein
the inner receptacle includes a pair of layers of thermoplastic film forming walls of the inner receptacle,
the receptacle includes a plurality of additional pairs of layers of thermoplastic film extending outward from each side of the inner receptacle to form walls of the plurality of nested receptacle members, and
opposite side edges and a bottom end of each pair of layers of thermoplastic film are sealed together.

4. The self cooling container of claim 1, wherein a portion of the refrigerant leaves the inner receptacle member as a gas through the refrigerant releasing aperture when the outer cap is removed.

5. The self cooling container of claim 1, wherein spaces within the receptacle outside the inner receptacle member between walls of adjacently nested receptacle members are filled with a fluid transferring pressure between the walls of adjacently nested receptacle members.

6. The self cooling container of claim 1, wherein pressures within spaces between walls of outwardly adjacent nested receptacle members are established in a gradient pattern having sequentially descending pressure values between a high pressure within the inner receptacle member and a low pressure outside the receptacle.

7. The self cooling container of claim 1, wherein a wall of at least one of the receptacle members is composed of an oriented polyethylene-terephalate film or a polyvinyl chloride film to resist further expansion after expanding through a predetermined distance.

* * * * *